(12) United States Patent
Hara et al.

(10) Patent No.: US 12,288,010 B2
(45) Date of Patent: *Apr. 29, 2025

(54) INFORMATION PROCESSING METHOD, NON-TRANSITORY COMPUTER READABLE MEDIUM HAVING RECORDED THEREON PROGRAM, AND INFORMATION PROCESSING DEVICE

(71) Applicant: Panasonic Intellectual Property Management Co., Ltd., Osaka (JP)

(72) Inventors: Nobuo Hara, Osaka (JP); Mikio Ushioda, Osaka (JP); Akihisa Nakahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 865 days.

This patent is subject to a terminal disclaimer.

(21) Appl. No.: 17/396,649

(22) Filed: Aug. 6, 2021

(65) Prior Publication Data

US 2022/0067237 A1  Mar. 3, 2022

(30) Foreign Application Priority Data

Aug. 27, 2020 (JP) ................. 2020-143447

(51) Int. Cl.
*G06F 30/20* (2020.01)
*G05B 13/04* (2006.01)
*G06F 111/10* (2020.01)

(52) U.S. Cl.
CPC .......... *G06F 30/20* (2020.01); *G05B 13/041* (2013.01); *G06F 2111/10* (2020.01)

(58) Field of Classification Search
CPC .... G06F 30/20; G06F 2111/10; G05B 13/041

(Continued)

(56) References Cited

U.S. PATENT DOCUMENTS 6,513,024 B1 * 1/2003 Li ................. G06N 20/00
  706/45
6,625,500 B1 * 9/2003 Li ................. G05B 13/021
  706/45

(Continued)

FOREIGN PATENT DOCUMENTS

JP  2006-017698  1/2006
JP  2008-241337  10/2008

OTHER PUBLICATIONS

Uy et al. (Optimization by Design of Experiment Techniques, 2009, IEEE, pp. 1-10) (Year: 2009).*

(Continued)

*Primary Examiner* — Iftekhar A Khan
(74) *Attorney, Agent, or Firm* — Wenderoth, Lind & Ponack, L.L.P.

(57) ABSTRACT

An information processing method includes: creating a first table by an experimental design method, calculating a first response surface using the first table, setting a fourth level value for a first control factor when the first response surface does not include a target value related to an object variable for the first control factor, creating a second table by the experimental design method by deleting at least one combination of the experimental conditions which include one level value for the first control factor from the first table and adding at least one combination of the experimental conditions based on the plurality of level values including the fourth level value and without including the one level value for the first control factor, calculating a second response surface including the target value using the second table, and outputting the second response surface.

6 Claims, 32 Drawing Sheets

(58) Field of Classification Search
USPC .......................................................... 703/2
See application file for complete search history.

(56) References Cited

U.S. PATENT DOCUMENTS

| | | | | |
|---|---|---|---|---|
| 7,831,418 B1* | 11/2010 | Sendhoff | .................. | G06F 30/15 700/29 |
| 8,065,132 B2* | 11/2011 | Chen | .................. | G06F 11/3457 703/22 |
| 8,306,788 B2* | 11/2012 | Chen | ....................... | G06F 30/20 703/2 |
| 8,751,273 B2* | 6/2014 | Pinto | ..................... | G06Q 10/067 705/7.11 |
| 9,200,583 B2* | 12/2015 | Jiang | ....................... | F02P 5/153 |
| 9,465,374 B2* | 10/2016 | Monroe | .................. | G05B 13/041 |
| 10,296,680 B2* | 5/2019 | Morgan | ................... | G06F 30/20 |
| 11,087,033 B1* | 8/2021 | Lekivetz | ................ | G06F 17/18 |
| 11,580,275 B1* | 2/2023 | Smullin | .................. | G06F 17/18 |
| 11,657,194 B2* | 5/2023 | Horesh | ................... | G06F 30/20 703/2 |
| 11,663,374 B2* | 5/2023 | Lekivetz | ................ | G06F 30/12 715/709 |
| 11,939,931 B2* | 3/2024 | Williams | ............... | F02D 41/248 |
| 2002/0128805 A1* | 9/2002 | Goldman | ............. | G05B 13/048 703/2 |
| 2003/0153095 A1* | 8/2003 | Cawse | ..................... | C40B 30/04 702/22 |
| 2003/0217337 A1* | 11/2003 | Prewett | ................ | G05B 13/048 703/2 |
| 2007/0136377 A1* | 6/2007 | Kawagishi | ............... | G06N 5/01 |
| 2008/0004855 A1* | 1/2008 | Sakai | ...................... | G06F 18/23 703/14 |
| 2008/0279434 A1* | 11/2008 | Cassill | ................... | G06Q 10/06 382/131 |
| 2008/0288091 A1* | 11/2008 | Yasui | ................... | F02D 41/1406 701/102 |
| 2009/0198430 A1* | 8/2009 | Yasui | ................... | F02D 41/1444 123/703 |
| 2009/0312992 A1* | 12/2009 | Chen | ....................... | G06F 30/20 703/2 |
| 2012/0239270 A1* | 9/2012 | Ikeda | ....................... | F02D 41/14 701/102 |
| 2013/0197684 A1* | 8/2013 | Oomuro | ................. | G06Q 50/04 700/97 |
| 2015/0081596 A1* | 3/2015 | Maaseidvaag | ........... | G06N 5/04 706/11 |
| 2016/0040478 A1* | 2/2016 | Lundy | ................... | G05B 15/02 700/275 |
| 2016/0048628 A1* | 2/2016 | Chien | ..................... | G03F 7/705 716/132 |
| 2016/0063423 A1* | 3/2016 | Rao | ..................... | G06Q 10/063 705/7.37 |
| 2018/0095936 A1* | 4/2018 | Bonnecaze | ............ | G06F 30/20 |
| 2018/0349798 A1* | 12/2018 | Avron | ................... | G06N 20/00 |
| 2020/0142389 A1* | 5/2020 | Inoue | ..................... | H01L 21/02 |
| 2021/0350049 A1* | 11/2021 | Zadorojniy | ............. | G06F 30/27 |
| 2022/0067237 A1* | 3/2022 | Hara | ....................... | G06F 30/15 |
| 2022/0180287 A1* | 6/2022 | Muto | ..................... | G06F 30/20 |

OTHER PUBLICATIONS

Youmin et al. (The Optimal test PID control for CVT Control System, 2009, IEEE, pp. 1-5) (Year: 2009).*

* cited by examiner

FIG. 5A

| No. | Control factor (temperature) | | | | |
|---|---|---|---|---|---|
| | X1 | X2 | X3 | X4 | X5 |
| 1 | 1 | -1 | 1 | -1 | 1 |
| 2 | 1 | -1 | -1 | -1 | -1 |
| 3 | 1 | -1 | 1 | 1 | -1 |
| 4 | 0 | 0 | 0 | 1 | 1 |
| 5 | -1 | -1 | 1 | -1 | -1 |
| 6 | 1 | 1 | -1 | -1 | 1 |
| 7 | 0 | 1 | 1 | -1 | 1 |
| 8 | 1 | -1 | -1 | 1 | 1 |
| 9 | 0 | -1 | 0 | 0 | 0 |
| 10 | 0 | 0 | 1 | 1 | 0 |
| 11 | -1 | 0 | 0 | 0 | 1 |
| 12 | 1 | 1 | 0 | 1 | 0 |
| 13 | 1 | 1 | -1 | 1 | -1 |
| 14 | -1 | 1 | 0 | -1 | 0 |
| 15 | -1 | 1 | -1 | 1 | 1 |
| 16 | 0 | 0 | -1 | 0 | 0 |
| 17 | -1 | -1 | -1 | 1 | -1 |
| 18 | 1 | 0 | 0 | -1 | 0 |
| 19 | -1 | 1 | 1 | 1 | -1 |
| 20 | 1 | 1 | 1 | -1 | -1 |
| 21 | 0 | -1 | 0 | 0 | 0 |
| 22 | 0 | 0 | 0 | 0 | -1 |
| 23 | -1 | -1 | 1 | 1 | 1 |
| 24 | -1 | 1 | -1 | -1 | -1 |
| 25 | 1 | 1 | 1 | 0 | 1 |
| 26 | -1 | -1 | -1 | -1 | 1 |
| 27 | -1 | 0 | 1 | 0 | 0 |

FIG. 5B

| No. | Control factor (temperature) | | | | | Object variable |
|---|---|---|---|---|---|---|
| | X1 | X2 | X3 | X4 | X5 | (film tickness [mm]) |
| 1 | 1 | -1 | 1 | -1 | 1 | -0.6 |
| 2 | 1 | -1 | -1 | -1 | -1 | 3.7 |
| 3 | 1 | -1 | 1 | 1 | -1 | 3.3 |
| 4 | 0 | 0 | 0 | 1 | 1 | -0.2 |
| 5 | -1 | -1 | 1 | -1 | -1 | 3.2 |
| 6 | 1 | 1 | -1 | -1 | 1 | 0.8 |
| 7 | 0 | 1 | 1 | -1 | 1 | -0.8 |
| 8 | 1 | -1 | -1 | 1 | 1 | 0 |
| 9 | 0 | -1 | 0 | 0 | 0 | 0.4 |
| 10 | 0 | 0 | 1 | 1 | 0 | 0.7 |
| 11 | -1 | 0 | 0 | 0 | 1 | -0.2 |
| 12 | 1 | 1 | 0 | 1 | 0 | 1.1 |
| 13 | 1 | 1 | -1 | 1 | -1 | 3.6 |
| 14 | -1 | 1 | 0 | -1 | 0 | 0.5 |
| 15 | -1 | 1 | -1 | 1 | 1 | -0.6 |
| 16 | 0 | 0 | -1 | 0 | 0 | 1.3 |
| 17 | -1 | -1 | -1 | 1 | -1 | 3.5 |
| 18 | 1 | 0 | 0 | -1 | 0 | 0.9 |
| 19 | -1 | 1 | 1 | 1 | -1 | 2.9 |
| 20 | 1 | 1 | 1 | -1 | -1 | 3.3 |
| 21 | 0 | -1 | 0 | 0 | 0 | 0.6 |
| 22 | 0 | 0 | 0 | 0 | -1 | 2.9 |
| 23 | -1 | -1 | 1 | 1 | 1 | 0.2 |
| 24 | -1 | 1 | -1 | -1 | -1 | 3.5 |
| 25 | 1 | 1 | 1 | 0 | 1 | 0 |
| 26 | -1 | -1 | -1 | -1 | 1 | 0.7 |
| 27 | -1 | 0 | 1 | 0 | 0 | 1 |

FIG. 5C

| No. | Control factor (temperature) | | | | | Object variable (film tickness [mm]) |
|---|---|---|---|---|---|---|
| | X1 | X2 | X3 | X4 | X5 | |
| 1 | 1 | -1 | 1 | -1 | 1 | -0.6 |
| 2 | 0 | 0 | 0 | 1 | 1 | -0.2 |
| 3 | 1 | 1 | -1 | -1 | 1 | 0.8 |
| 4 | 0 | 1 | 1 | -1 | 1 | -0.8 |
| 5 | 1 | -1 | -1 | 1 | 1 | 0 |
| 6 | 0 | -1 | 0 | 0 | 0 | 0.4 |
| 7 | 0 | 0 | 1 | 1 | 0 | 0.7 |
| 8 | -1 | 0 | 0 | 0 | 1 | -0.2 |
| 9 | 1 | 1 | 0 | 1 | 0 | 1.1 |
| 10 | -1 | 1 | 0 | -1 | 0 | 0.5 |
| 11 | -1 | 1 | -1 | 1 | 1 | -0.6 |
| 12 | 0 | 0 | -1 | 0 | 0 | 1.3 |
| 13 | 1 | 0 | 0 | -1 | 0 | 0.9 |
| 14 | 0 | -1 | 0 | 0 | 0 | 0.6 |
| 15 | -1 | -1 | 1 | 1 | 1 | 0.2 |
| 16 | 1 | 1 | 1 | 0 | 1 | 0 |
| 17 | -1 | -1 | -1 | -1 | 1 | 0.7 |
| 18 | -1 | 0 | 1 | 0 | 0 | 1 |

FIG. 5D

| No. | Control factor (temperature) | | | | | Object variable (film tickness [mm]) |
|---|---|---|---|---|---|---|
| | X1 | X2 | X3 | X4 | X5 | |
| 1 | 1 | -1 | 1 | -1 | 1 | -0.6 |
| 2 | 0 | 0 | 0 | 1 | 1 | -0.2 |
| 3 | 1 | 1 | -1 | -1 | 1 | 0.8 |
| 4 | 0 | 1 | 1 | -1 | 1 | -0.8 |
| 5 | 1 | -1 | -1 | 1 | 1 | 0 |
| 6 | 0 | -1 | 0 | 0 | 0 | 0.4 |
| 7 | 0 | 0 | 1 | 1 | 0 | 0.7 |
| 8 | -1 | 0 | 0 | 0 | 1 | -0.2 |
| 9 | 1 | 1 | 0 | 1 | 0 | 1.1 |
| 10 | -1 | 1 | 0 | -1 | 0 | 0.5 |
| 11 | -1 | 1 | -1 | 1 | 1 | -0.6 |
| 12 | 0 | 0 | -1 | 0 | 0 | 1.3 |
| 13 | 1 | 0 | 0 | -1 | 0 | 0.9 |
| 14 | 0 | -1 | 0 | 0 | 0 | 0.6 |
| 15 | -1 | -1 | 1 | 1 | 1 | 0.2 |
| 16 | 1 | 1 | 1 | 0 | 1 | 0 |
| 17 | -1 | -1 | -1 | -1 | 1 | 0.7 |
| 18 | -1 | 0 | 1 | 0 | 0 | 1 |
| 19 | 1 | 1 | 1 | -1 | 0 | |
| 20 | -1 | -1 | 1 | 1 | 2 | |
| 21 | -1 | 1 | -1 | 0 | 2 | |
| 22 | -1 | 1 | 1 | 1 | 0 | |
| 23 | 1 | 1 | -1 | -1 | 2 | |
| 24 | -1 | -1 | 1 | -1 | 0 | |
| 25 | 1 | 1 | 1 | 1 | 2 | |
| 26 | 0 | 1 | -1 | 1 | 2 | |
| 27 | 1 | -1 | 1 | 1 | 0 | |
| 28 | -1 | -1 | -1 | 1 | 0 | |
| 29 | 1 | -1 | 1 | -1 | 2 | |
| 30 | 1 | 1 | -1 | 1 | 0 | |
| 31 | 1 | -1 | -1 | 1 | 2 | |
| 32 | -1 | 1 | -1 | -1 | 0 | |
| 33 | 1 | -1 | -1 | -1 | 0 | |
| 34 | -1 | -1 | -1 | -1 | 2 | |
| 35 | -1 | 1 | 1 | -1 | 2 | |

FIG. 5E

| No. | Control factor (temperature) | | | | | Object variable (film tickness [mm]) |
|---|---|---|---|---|---|---|
| | X1 | X2 | X3 | X4 | X5 | |
| 1 | 1 | -1 | 1 | -1 | 1 | -0.6 |
| 2 | 0 | 0 | 0 | 1 | 1 | -0.2 |
| 3 | 1 | 1 | -1 | -1 | 1 | 0.8 |
| 4 | 0 | 1 | 1 | -1 | 1 | -0.8 |
| 5 | 1 | -1 | -1 | 1 | 1 | 0 |
| 6 | 0 | -1 | 0 | 0 | 0 | 0.4 |
| 7 | 0 | 0 | 1 | 1 | 0 | 0.7 |
| 8 | -1 | 0 | 0 | 0 | 1 | -0.2 |
| 9 | 1 | 1 | 0 | 1 | 0 | 1.1 |
| 10 | -1 | 1 | 0 | -1 | 0 | 0.5 |
| 11 | -1 | 1 | -1 | 1 | 1 | -0.6 |
| 12 | 0 | 0 | -1 | 0 | 0 | 1.3 |
| 13 | 1 | 0 | 0 | -1 | 0 | 0.9 |
| 14 | 0 | -1 | 0 | 0 | 0 | 0.6 |
| 15 | -1 | -1 | 1 | 1 | 1 | 0.2 |
| 16 | 1 | 1 | 1 | 0 | 1 | 0 |
| 17 | -1 | -1 | -1 | -1 | 1 | 0.7 |
| 18 | -1 | 0 | 1 | 0 | 0 | 1 |
| 19 | 1 | 1 | 1 | -1 | 0 | 1 |
| 20 | -1 | -1 | 1 | 1 | 2 | 0.3 |
| 21 | -1 | 1 | -1 | 0 | 2 | -0.2 |
| 22 | -1 | 1 | 1 | 1 | 0 | 0.9 |
| 23 | 1 | 1 | -1 | -1 | 2 | 0.7 |
| 24 | -1 | -1 | 1 | -1 | 0 | 0.6 |
| 25 | 1 | 1 | 1 | 1 | 2 | 0.2 |
| 26 | 0 | 1 | -1 | 1 | 2 | -0.4 |
| 27 | 1 | -1 | 1 | 1 | 0 | 0.7 |
| 28 | -1 | -1 | -1 | 1 | 0 | 1.3 |
| 29 | 1 | -1 | 1 | -1 | 2 | -0.8 |
| 30 | 1 | 1 | -1 | 1 | 0 | 1.4 |
| 31 | 1 | -1 | -1 | 1 | 2 | -0.2 |
| 32 | -1 | 1 | -1 | -1 | 0 | 1.0 |
| 33 | 1 | -1 | -1 | -1 | 0 | 1.2 |
| 34 | -1 | -1 | -1 | -1 | 2 | 0.5 |
| 35 | -1 | 1 | 1 | -1 | 2 | -0.7 |

FIG. 5F

| Design | Level of parameter | | | | | Number of designs | | | VaiI_ADD | | Optimum value | Overall |
|---|---|---|---|---|---|---|---|---|---|---|---|---|
| | X1 | X2 | X3 | X4 | X5 | Initial | Addition | Total | Evaluation | Determination | | |
| 27 initial designs | -1,0,1 | -1,0,1 | -1,0,1 | -1,0,1 | -1,0,1 | 27 | - | 27 | 0.391 | - | Unsatisfied | Unsatisfied |
| 27 redesigns | -1,0,1 | -1,0,1 | -1,0,1 | -1,0,1 | 0,1,2 | 27 | 27 | 54 | 0.391 | - | Satisfied | Satisfied |

FIG. 5G

| Design | Level of parameter | | | | | Number of designs | | | Vall_ADD | | Optimum value | Overall |
|---|---|---|---|---|---|---|---|---|---|---|---|---|
| | X1 | X2 | X3 | X4 | X5 | Initial | Addition | Total | Evaluation | Determination | | |
| 27 Initial designs | -1,0,1 | -1,0,1 | -1,0,1 | -1,0,1 | -1,0,1 | 27 | - | 27 | 0.391 | Reference (Vall_0) | Unsatisfied | Unsatisfied |
| 9 Redesigns | -1,0,1 | -1,0,1 | -1,0,1 | -1,0,1 | 0,1,2 | 27 | 9 | 36 | 0.543 | Unsatisfied | Satisfied | Unsatisfied |
| 11 Redesigns | -1,0,1 | -1,0,1 | -1,0,1 | -1,0,1 | 0,1,2 | 27 | 11 | 38 | 0.495 | Unsatisfied | Satisfied | Unsatisfied |
| 13 Redesigns | -1,0,1 | -1,0,1 | -1,0,1 | -1,0,1 | 0,1,2 | 27 | 13 | 40 | 0.454 | Unsatisfied | Satisfied | Unsatisfied |
| 15 Redesigns | -1,0,1 | -1,0,1 | -1,0,1 | -1,0,1 | 0,1,2 | 27 | 15 | 42 | 0.418 | Unsatisfied | Satisfied | Unsatisfied |
| 16 Redesigns | -1,0,1 | -1,0,1 | -1,0,1 | -1,0,1 | 0,1,2 | 27 | 16 | 43 | 0.399 | Unsatisfied | Satisfied | Unsatisfied |
| 17 Redesigns | -1,0,1 | -1,0,1 | -1,0,1 | -1,0,1 | 0,1,2 | 27 | 17 | 44 | 0.381 | Satisfied | Satisfied | Satisfied |

FIG. 6A

| No. | Control factor (temperature) | | | | |
|---|---|---|---|---|---|
| | X1 | X2 | X3 | X4 | X5 |
| 1 | 1 | -1 | 1 | -1 | 1 |
| 2 | 1 | -1 | -1 | -1 | -1 |
| 3 | 1 | -1 | 1 | 1 | -1 |
| 4 | 0 | 0 | 0 | 1 | 1 |
| 5 | -1 | -1 | 1 | -1 | -1 |
| 6 | 1 | 1 | -1 | -1 | 1 |
| 7 | 0 | 1 | 1 | -1 | 1 |
| 8 | 1 | -1 | -1 | 1 | 1 |
| 9 | 0 | -1 | 0 | 0 | 0 |
| 10 | 0 | 0 | 1 | 1 | 0 |
| 11 | -1 | 0 | 0 | 0 | 1 |
| 12 | 1 | 1 | 0 | 1 | 0 |
| 13 | 1 | 1 | -1 | 1 | -1 |
| 14 | -1 | 1 | 0 | -1 | 0 |
| 15 | -1 | 1 | -1 | 1 | 1 |
| 16 | 0 | 0 | -1 | 0 | 0 |
| 17 | -1 | -1 | -1 | 1 | -1 |
| 18 | 1 | 0 | 0 | -1 | 0 |
| 19 | -1 | 1 | 1 | 1 | -1 |
| 20 | 1 | 1 | 1 | -1 | -1 |
| 21 | 0 | -1 | 0 | 0 | 0 |
| 22 | 0 | 0 | 0 | 0 | -1 |
| 23 | -1 | -1 | 1 | 1 | 1 |
| 24 | -1 | 1 | -1 | -1 | -1 |
| 25 | 1 | 1 | 1 | 0 | 1 |
| 26 | -1 | -1 | -1 | -1 | 1 |
| 27 | -1 | 0 | 1 | 0 | 0 |

FIG. 6B

| No. | Control factor (temperature) | | | | | Object variable (film tickness [mm]) |
|---|---|---|---|---|---|---|
| | X1 | X2 | X3 | X4 | X5 | |
| 1 | 1 | -1 | 1 | -1 | 1 | -1.3 |
| 2 | 1 | -1 | -1 | -1 | -1 | 5.2 |
| 3 | 1 | -1 | 1 | 1 | -1 | 4.7 |
| 4 | 0 | 0 | 0 | 1 | 1 | -1.1 |
| 5 | -1 | -1 | 1 | -1 | -1 | 4.8 |
| 6 | 1 | 1 | -1 | -1 | 1 | 0 |
| 7 | 0 | 1 | 1 | -1 | 1 | -1.1 |
| 8 | 1 | -1 | -1 | 1 | 1 | -0.9 |
| 9 | 0 | -1 | 0 | 0 | 0 | 1.2 |
| 10 | 0 | 0 | 1 | 1 | 0 | 1.7 |
| 11 | -1 | 0 | 0 | 0 | 1 | -0.7 |
| 12 | 1 | 1 | 0 | 1 | 0 | 1.8 |
| 13 | 1 | 1 | -1 | 1 | -1 | 5.4 |
| 14 | -1 | 1 | 0 | -1 | 0 | 1.2 |
| 15 | -1 | 1 | -1 | 1 | 1 | -0.9 |
| 16 | 0 | 0 | -1 | 0 | 0 | 1.4 |
| 17 | -1 | -1 | -1 | 1 | -1 | 5.3 |
| 18 | 1 | 0 | 0 | -1 | 0 | 1.3 |
| 19 | -1 | 1 | 1 | 1 | -1 | 4.7 |
| 20 | 1 | 1 | 1 | -1 | -1 | 4.8 |
| 21 | 0 | -1 | 0 | 0 | 0 | 1.3 |
| 22 | 0 | 0 | 0 | 0 | -1 | 4.7 |
| 23 | -1 | -1 | 1 | 1 | 1 | -0.3 |
| 24 | -1 | 1 | -1 | -1 | -1 | 5.1 |
| 25 | 1 | 1 | 1 | 0 | 1 | -0.9 |
| 26 | -1 | -1 | -1 | -1 | 1 | 0.1 |
| 27 | -1 | 0 | 1 | 0 | 0 | 1.4 |

FIG. 6C

| No. | Control factor (temperature) | | | | | Object variable (film tickness [mm]) |
|---|---|---|---|---|---|---|
| | X1 | X2 | X3 | X4 | X5 | |
| 1 | 1 | -1 | 1 | -1 | 1 | -1.3 |
| 2 | 1 | -1 | -1 | -1 | -1 | 5.2 |
| 3 | 1 | -1 | 1 | 1 | -1 | 4.7 |
| 4 | 0 | 0 | 0 | 1 | 1 | -1.1 |
| 5 | -1 | -1 | 1 | -1 | -1 | 4.8 |
| 6 | 1 | 1 | -1 | -1 | 1 | 0 |
| 7 | 0 | 1 | 1 | -1 | 1 | -1.1 |
| 8 | 1 | -1 | -1 | 1 | 1 | -0.9 |
| 9 | -1 | 0 | 0 | 0 | 1 | -0.7 |
| 10 | 1 | 1 | -1 | 1 | -1 | 5.4 |
| 11 | -1 | 1 | -1 | 1 | 1 | -0.9 |
| 12 | -1 | -1 | -1 | 1 | -1 | 5.3 |
| 13 | -1 | 1 | 1 | 1 | -1 | 4.7 |
| 14 | 1 | 1 | 1 | -1 | -1 | 4.8 |
| 15 | 0 | 0 | 0 | 0 | -1 | 4.7 |
| 16 | -1 | -1 | 1 | 1 | 1 | -0.3 |
| 17 | -1 | 1 | -1 | -1 | -1 | 5.1 |
| 18 | 1 | 1 | 1 | 0 | 1 | -0.9 |
| 19 | -1 | -1 | -1 | -1 | 1 | 0.1 |

FIG. 6D

| No. | Control factor (temperature) | | | | | Object variable (film tickness [mm]) |
|---|---|---|---|---|---|---|
| | X1 | X2 | X3 | X4 | X5 | |
| 1 | 1 | -1 | 1 | -1 | 1 | -1.3 |
| 2 | 1 | -1 | -1 | -1 | -1 | 5.2 |
| 3 | 1 | -1 | 1 | 1 | -1 | 4.7 |
| 4 | 0 | 0 | 0 | 1 | 1 | -1.1 |
| 5 | -1 | -1 | 1 | -1 | -1 | 4.8 |
| 6 | 1 | 1 | -1 | -1 | 1 | 0 |
| 7 | 0 | 1 | 1 | -1 | 1 | -1.1 |
| 8 | 1 | -1 | -1 | 1 | 1 | -0.9 |
| 9 | -1 | 0 | 0 | 0 | 1 | -0.7 |
| 10 | 1 | 1 | -1 | 1 | -1 | 5.4 |
| 11 | -1 | 1 | -1 | 1 | 1 | -0.9 |
| 12 | -1 | -1 | -1 | 1 | -1 | 5.3 |
| 13 | -1 | 1 | 1 | 1 | -1 | 4.7 |
| 14 | 1 | 1 | 1 | -1 | -1 | 4.8 |
| 15 | 0 | 0 | 0 | 0 | -1 | -0.3 |
| 16 | -1 | -1 | 1 | 1 | 1 | 5.1 |
| 17 | -1 | 1 | -1 | -1 | -1 | -0.9 |
| 18 | 1 | 1 | 1 | 0 | 1 | 0.1 |
| 19 | -1 | -1 | -1 | -1 | 1 | |
| 20 | 1 | 1 | 0 | -1 | 3 | |
| 21 | 1 | 1 | 1 | 1 | 3 | |
| 22 | 1 | -1 | 1 | -1 | 3 | |
| 23 | -1 | -1 | 1 | 0 | 3 | |
| 24 | 0 | -1 | 1 | 1 | 3 | |
| 25 | -1 | 0 | -1 | -1 | 3 | |
| 26 | 0 | -1 | -1 | -1 | 3 | |
| 27 | -1 | 1 | 1 | -1 | 3 | |
| 28 | -1 | 1 | 0 | 1 | 3 | |
| 29 | 1 | 1 | 0 | 1 | -1 | |
| 30 | -1 | -1 | -1 | 1 | 3 | |
| 31 | -1 | 1 | 0 | -1 | -1 | |
| 32 | 0 | 1 | -1 | 0 | 3 | |
| 33 | 1 | 0 | -1 | -1 | -1 | |
| 34 | 1 | 0 | -1 | 1 | 3 | |
| 35 | 1 | -1 | -1 | 0 | 3 | |

FIG. 6E

| No. | Control factor (temperature) | | | | | Object variable (film tickness [mm]) |
|---|---|---|---|---|---|---|
| | X1 | X2 | X3 | X4 | X5 | |
| 1 | 1 | -1 | 1 | -1 | 1 | -1.3 |
| 2 | 1 | -1 | -1 | -1 | -1 | 5.2 |
| 3 | 1 | -1 | 1 | 1 | -1 | 4.7 |
| 4 | 0 | 0 | 0 | 1 | 1 | -1.1 |
| 5 | -1 | -1 | 1 | -1 | -1 | 4.8 |
| 6 | 1 | 1 | -1 | -1 | 1 | 0 |
| 7 | 0 | 1 | 1 | -1 | 1 | -1.1 |
| 8 | 1 | -1 | -1 | 1 | 1 | -0.9 |
| 9 | -1 | 0 | 0 | 0 | 1 | -0.7 |
| 10 | 1 | 1 | -1 | 1 | -1 | 5.4 |
| 11 | -1 | 1 | -1 | 1 | 1 | -0.9 |
| 12 | -1 | -1 | -1 | 1 | -1 | 5.3 |
| 13 | -1 | 1 | 1 | 1 | -1 | 4.7 |
| 14 | 1 | 1 | 1 | -1 | -1 | 4.8 |
| 15 | 0 | 0 | 0 | 0 | -1 | 4.7 |
| 16 | -1 | -1 | 1 | 1 | 1 | -0.3 |
| 17 | -1 | 1 | -1 | -1 | -1 | 5.1 |
| 18 | 1 | 1 | 1 | 0 | 1 | -0.9 |
| 19 | -1 | -1 | -1 | -1 | 1 | 0.1 |
| 20 | 1 | 1 | 0 | -1 | 3 | -1.5 |
| 21 | 1 | 1 | 1 | 1 | 3 | -1.3 |
| 22 | 1 | -1 | 1 | -1 | 3 | -2.3 |
| 23 | -1 | -1 | 1 | 0 | 3 | -1.8 |
| 24 | 0 | -1 | 1 | 1 | 3 | -1.7 |
| 25 | -1 | 0 | -1 | -1 | 3 | -1.4 |
| 26 | 0 | -1 | -1 | -1 | 3 | -1.5 |
| 27 | -1 | 1 | 1 | -1 | 3 | -2.3 |
| 28 | -1 | 1 | 0 | 1 | 3 | -2.3 |
| 29 | 1 | 1 | 0 | 1 | -1 | 5.2 |
| 30 | -1 | -1 | -1 | 1 | 3 | -1.5 |
| 31 | -1 | 1 | 0 | -1 | -1 | 4.5 |
| 32 | 0 | 1 | -1 | 0 | 3 | -1.8 |
| 33 | 1 | 0 | -1 | -1 | -1 | 5.5 |
| 34 | 1 | 0 | -1 | 1 | 3 | -1.7 |
| 35 | 1 | -1 | -1 | 0 | 3 | -1.8 |

FIG. 6F

| Design | Level of parameter | | | | | Number of designs | | | Val_ADD | | Optimum value | Overall |
|---|---|---|---|---|---|---|---|---|---|---|---|---|
| | X1 | X2 | X3 | X4 | X5 | Initial | Addition | Total | Evaluation | Determination | | |
| 27 initial designs | -1,0,1 | -1,0,1 | -1,0,1 | -1,0,1 | -1,0,1 | 27 | - | 27 | 0.391 | - | Unsatisfied | Unsatisfied |
| 27 redesigns | -1,0,1 | -1,0,1 | -1,0,1 | -1,0,1 | -1,1,3 | 27 | 27 | 54 | 0.391 | - | Satisfied | Satisfied |

FIG. 6G

| Design | Level of parameter | | | | | Number of designs | | | Vail_ADD | | Optimum value | Overall |
|---|---|---|---|---|---|---|---|---|---|---|---|---|
| | X1 | X2 | X3 | X4 | X5 | Initial | Addition | Total | Evaluation | Determination | | |
| 27 Initial designs | -1,0,1 | -1,0,1 | -1,0,1 | -1,0,1 | -1,0,1 | 27 | - | 27 | 0.391 | Reference (Vail_0) | Unsatisfied | Unsatisfied |
| 8 Redesigns | -1,0,1 | -1,0,1 | -1,0,1 | -1,0,1 | -1,1,3 | 27 | 8 | 35 | 0.484 | Unsatisfied | Satisfied | Unsatisfied |
| 10 Redesigns | -1,0,1 | -1,0,1 | -1,0,1 | -1,0,1 | -1,1,3 | 27 | 10 | 37 | 0.472 | Unsatisfied | Satisfied | Unsatisfied |
| 12 Redesigns | -1,0,1 | -1,0,1 | -1,0,1 | -1,0,1 | -1,1,3 | 27 | 12 | 39 | 0.452 | Unsatisfied | Satisfied | Unsatisfied |
| 14 Redesigns | -1,0,1 | -1,0,1 | -1,0,1 | -1,0,1 | -1,1,3 | 27 | 14 | 41 | 0.407 | Unsatisfied | Satisfied | Unsatisfied |
| 15 Redesigns | -1,0,1 | -1,0,1 | -1,0,1 | -1,0,1 | -1,1,3 | 27 | 15 | 42 | 0.396 | Unsatisfied | Satisfied | Unsatisfied |
| 16 Redesigns | -1,0,1 | -1,0,1 | -1,0,1 | -1,0,1 | -1,1,3 | 27 | 16 | 43 | 0.383 | Satisfied | Satisfied | Satisfied |

FIG. 7A

| No. | Control factor (temperature) | | | | |
|---|---|---|---|---|---|
| | X1 | X2 | X3 | X4 | X5 |
| 1 | 1 | -1 | 1 | -1 | 1 |
| 2 | 1 | -1 | -1 | -1 | -1 |
| 3 | 1 | -1 | 1 | 1 | -1 |
| 4 | 0 | 0 | 0 | 1 | 1 |
| 5 | -1 | -1 | 1 | -1 | -1 |
| 6 | 1 | 1 | -1 | -1 | 1 |
| 7 | 0 | 1 | 1 | -1 | 1 |
| 8 | 1 | -1 | -1 | 1 | 1 |
| 9 | 0 | -1 | 0 | 0 | 0 |
| 10 | 0 | 0 | 1 | 1 | 0 |
| 11 | -1 | 0 | 0 | 0 | 1 |
| 12 | 1 | 1 | 0 | 1 | 0 |
| 13 | 1 | 1 | -1 | 1 | -1 |
| 14 | -1 | 1 | 0 | -1 | 0 |
| 15 | -1 | 1 | -1 | 1 | 1 |
| 16 | 0 | 0 | -1 | 0 | 0 |
| 17 | -1 | -1 | -1 | 1 | -1 |
| 18 | 1 | 0 | 0 | -1 | 0 |
| 19 | -1 | 1 | 1 | 1 | -1 |
| 20 | 1 | 1 | 1 | -1 | -1 |
| 21 | 0 | -1 | 0 | 0 | 0 |
| 22 | 0 | 0 | 0 | 0 | -1 |
| 23 | -1 | -1 | 1 | 1 | 1 |
| 24 | -1 | 1 | -1 | -1 | -1 |
| 25 | 1 | 1 | 1 | 0 | 1 |
| 26 | -1 | -1 | -1 | -1 | 1 |
| 27 | -1 | 0 | 1 | 0 | 0 |

FIG. 7B

| No. | Control factor (temperature) | | | | | Object variable |
|---|---|---|---|---|---|---|
| | X1 | X2 | X3 | X4 | X5 | (film tickness [mm]) |
| 1 | 1 | -1 | 1 | -1 | 1 | 2.7 |
| 2 | 1 | -1 | -1 | -1 | -1 | 0 |
| 3 | 1 | -1 | 1 | 1 | -1 | 0 |
| 4 | 0 | 0 | 0 | 1 | 1 | 2.9 |
| 5 | -1 | -1 | 1 | -1 | -1 | -0.3 |
| 6 | 1 | 1 | -1 | -1 | 1 | 4.1 |
| 7 | 0 | 1 | 1 | -1 | 1 | 2.7 |
| 8 | 1 | -1 | -1 | 1 | 1 | 3 |
| 9 | 0 | -1 | 0 | 0 | 0 | 0.8 |
| 10 | 0 | 0 | 1 | 1 | 0 | 1 |
| 11 | -1 | 0 | 0 | 0 | 1 | 3.1 |
| 12 | 1 | 1 | 0 | 1 | 0 | 1.3 |
| 13 | 1 | 1 | -1 | 1 | -1 | 0.2 |
| 14 | -1 | 1 | 0 | -1 | 0 | 0.7 |
| 15 | -1 | 1 | -1 | 1 | 1 | 3 |
| 16 | 0 | 0 | -1 | 0 | 0 | 1.1 |
| 17 | -1 | -1 | -1 | 1 | -1 | 0.4 |
| 18 | 1 | 0 | 0 | -1 | 0 | 1.1 |
| 19 | -1 | 1 | 1 | 1 | -1 | -0.3 |
| 20 | 1 | 1 | 1 | -1 | -1 | -0.2 |
| 21 | 0 | -1 | 0 | 0 | 0 | 0.8 |
| 22 | 0 | 0 | 0 | 0 | -1 | -0.4 |
| 23 | -1 | -1 | 1 | 1 | 1 | 3.5 |
| 24 | -1 | 1 | -1 | -1 | -1 | 0 |
| 25 | 1 | 1 | 1 | 0 | 1 | 3.3 |
| 26 | -1 | -1 | -1 | -1 | 1 | 3.9 |
| 27 | -1 | 0 | 1 | 0 | 0 | 0.8 |

FIG. 7C

| No. | Control factor (temperature) | | | | | Object variable (film tickness [mm]) |
|---|---|---|---|---|---|---|
| | X1 | X2 | X3 | X4 | X5 | |
| 1 | 1 | -1 | -1 | -1 | -1 | 0 |
| 2 | 1 | -1 | 1 | 1 | -1 | 0 |
| 3 | -1 | -1 | 1 | -1 | -1 | -0.3 |
| 4 | 0 | -1 | 0 | 0 | 0 | 0.8 |
| 5 | 0 | 0 | 1 | 1 | 0 | 1 |
| 6 | 1 | 1 | 0 | 1 | 0 | 1.3 |
| 7 | 1 | 1 | -1 | 1 | -1 | 0.2 |
| 8 | -1 | 1 | 0 | -1 | 0 | 0.7 |
| 9 | 0 | 0 | -1 | 0 | 0 | 1.1 |
| 10 | -1 | -1 | -1 | 1 | -1 | 0.4 |
| 11 | 1 | 0 | 0 | -1 | 0 | 1.1 |
| 12 | -1 | 1 | 1 | 1 | -1 | -0.3 |
| 13 | 1 | 1 | 1 | -1 | -1 | -0.2 |
| 14 | 0 | -1 | 0 | 0 | 0 | 0.8 |
| 15 | 0 | 0 | 0 | 0 | -1 | -0.4 |
| 16 | -1 | 1 | -1 | -1 | -1 | 0 |
| 17 | -1 | 0 | 1 | 0 | 0 | 0.8 |

FIG. 7D

| No. | Control factor (temperature) | | | | | Object variable (film tickness [mm]) |
|---|---|---|---|---|---|---|
| | X1 | X2 | X3 | X4 | X5 | |
| 1 | 1 | -1 | -1 | -1 | -1 | 0 |
| 2 | 1 | -1 | 1 | 1 | -1 | 0 |
| 3 | -1 | -1 | 1 | -1 | -1 | -0.3 |
| 4 | 0 | -1 | 0 | 0 | 0 | 0.8 |
| 5 | 0 | 0 | 1 | 1 | 0 | 1 |
| 6 | 1 | 1 | 0 | 1 | 0 | 1.3 |
| 7 | 1 | 1 | -1 | 1 | -1 | 0.2 |
| 8 | -1 | 1 | 0 | -1 | 0 | 0.7 |
| 9 | 0 | 0 | -1 | 0 | 0 | 1.1 |
| 10 | -1 | -1 | -1 | 1 | -1 | 0.4 |
| 11 | 1 | 0 | 0 | -1 | 0 | 1.1 |
| 12 | -1 | 1 | 1 | 1 | -1 | -0.3 |
| 13 | 1 | 1 | 1 | -1 | -1 | -0.2 |
| 14 | 0 | -1 | 0 | 0 | 0 | 0.8 |
| 15 | 0 | 0 | 0 | 0 | -1 | -0.4 |
| 16 | -1 | 1 | -1 | -1 | -1 | 0 |
| 17 | -1 | 0 | 1 | 0 | 0 | 0.8 |
| 18 | 1 | 1 | -1 | -1 | 0 | |
| 19 | -1 | 0 | -1 | 1 | -2 | |
| 20 | -1 | 1 | 1 | -1 | -2 | |
| 21 | 1 | -1 | 1 | -1 | 0 | |
| 22 | 1 | 1 | 1 | 1 | -2 | |
| 23 | 1 | -1 | -1 | 1 | 0 | |
| 24 | 1 | 0 | 0 | -1 | -2 | |
| 25 | -1 | 1 | -1 | 1 | 0 | |
| 26 | 0 | 1 | -1 | 1 | -2 | |
| 27 | -1 | -1 | 1 | 1 | -2 | |
| 28 | 1 | 1 | -1 | -1 | -2 | |
| 29 | 0 | -1 | 1 | -1 | -2 | |
| 30 | 1 | -1 | 1 | 0 | -2 | |
| 31 | 0 | 1 | 1 | -1 | 0 | |
| 32 | -1 | 1 | -1 | 0 | -2 | |
| 33 | -1 | -1 | 1 | 1 | 0 | |
| 34 | -1 | -1 | -1 | -1 | -2 | |
| 35 | 1 | -1 | -1 | 1 | -2 | |
| 36 | -1 | -1 | -1 | -1 | 0 | |
| 37 | 1 | 1 | 1 | 0 | 0 | |

FIG. 7E

| No. | Control factor (temperature) | | | | | Object variable (film tickness [mm]) |
|---|---|---|---|---|---|---|
| | X1 | X2 | X3 | X4 | X5 | |
| 1 | 1 | -1 | -1 | -1 | -1 | 0 |
| 2 | 1 | -1 | 1 | 1 | -1 | 0 |
| 3 | -1 | -1 | 1 | -1 | -1 | -0.3 |
| 4 | 0 | -1 | 0 | 0 | 0 | 0.8 |
| 5 | 0 | 0 | 1 | 1 | 0 | 1 |
| 6 | 1 | 1 | 0 | 1 | 0 | 1.3 |
| 7 | 1 | 1 | -1 | 1 | -1 | 0.2 |
| 8 | -1 | 1 | 0 | -1 | 0 | 0.7 |
| 9 | 0 | 0 | -1 | 0 | 0 | 1.1 |
| 10 | -1 | -1 | -1 | 1 | -1 | 0.4 |
| 11 | 1 | 0 | 0 | -1 | 0 | 1.1 |
| 12 | -1 | 1 | 1 | 1 | -1 | -0.3 |
| 13 | 1 | 1 | 1 | -1 | -1 | -0.2 |
| 14 | 0 | -1 | 0 | 0 | 0 | 0.8 |
| 15 | 0 | 0 | 0 | 0 | -1 | -0.4 |
| 16 | -1 | 1 | -1 | -1 | -1 | 0 |
| 17 | -1 | 0 | 1 | 0 | 0 | 0.8 |
| 18 | 1 | 1 | -1 | -1 | 0 | 1.8 |
| 19 | -1 | 0 | -1 | 1 | -2 | -0.1 |
| 20 | -1 | 1 | 1 | -1 | -2 | -0.7 |
| 21 | 1 | -1 | 1 | -1 | 0 | 0.6 |
| 22 | 1 | 1 | 1 | 1 | -2 | 0.2 |
| 23 | 1 | -1 | -1 | 1 | 0 | 0.8 |
| 24 | 1 | 0 | 0 | -1 | -2 | -0.2 |
| 25 | -1 | 1 | -1 | 1 | 0 | 0.7 |
| 26 | 0 | 1 | -1 | 1 | -2 | -0.4 |
| 27 | -1 | -1 | 1 | 1 | -2 | 0.3 |
| 28 | 1 | 1 | -1 | -1 | -2 | 0.6 |
| 29 | 0 | -1 | 1 | -1 | -2 | -0.7 |
| 30 | 1 | -1 | 1 | 0 | -2 | -0.6 |
| 31 | 0 | 1 | 1 | -1 | 0 | 0.3 |
| 32 | -1 | 1 | -1 | 0 | -2 | 0 |
| 33 | -1 | -1 | 1 | 1 | 0 | 1.4 |
| 34 | -1 | -1 | -1 | -1 | -2 | 0.7 |
| 35 | 1 | -1 | -1 | 1 | -2 | -0.3 |
| 36 | -1 | -1 | -1 | -1 | 0 | 1.7 |
| 37 | 1 | 1 | 1 | 0 | 0 | 1 |

FIG. 7F

| Design | Level of parameter | | | | | Number of designs | | | Val1_ADD | | | Optimum value | Overall |
| --- | --- | --- | --- | --- | --- | --- | --- | --- | --- | --- | --- | --- | --- |
| | X1 | X2 | X3 | X4 | X5 | Initial | Addition | Total | Evaluation | Determination | | | |
| 27 initial designs | -1,0,1 | -1,0,1 | -1,0,1 | -1,0,1 | -1,0,1 | 27 | - | 27 | 0.391 | - | | Unsatisfied | Unsatisfied |
| 27 redesigns | -1,0,1 | -1,0,1 | -1,0,1 | -1,0,1 | -2,-1,0 | 27 | 27 | 54 | 0.391 | - | | Satisfied | Satisfied |

FIG. 7G

| Design | Level of parameter | | | | | Number of designs | | | Val_ADD | | Optimum value | Overall |
|---|---|---|---|---|---|---|---|---|---|---|---|---|
| | X1 | X2 | X3 | X4 | X5 | Initial | Addition | Total | Evaluation | Determination | | |
| 21 Initial designs | -1,0,1 | -1,0,1 | -1,0,1 | -1,0,1 | -1,0,1 | 27 | - | 27 | 0.391 | Reference (Val_0) | Unsatisfied | Unsatisfied |
| 10 Redesigns | -1,0,1 | -1,0,1 | -1,0,1 | -1,0,1 | -2,-1,0 | 27 | 10 | 37 | 0.682 | Unsatisfied | Satisfied | Unsatisfied |
| 12 Redesigns | -1,0,1 | -1,0,1 | -1,0,1 | -1,0,1 | -2,-1,0 | 27 | 12 | 39 | 0.569 | Unsatisfied | Satisfied | Unsatisfied |
| 14 Redesigns | -1,0,1 | -1,0,1 | -1,0,1 | -1,0,1 | -2,-1,0 | 27 | 14 | 41 | 0.508 | Unsatisfied | Satisfied | Unsatisfied |
| 16 Redesigns | -1,0,1 | -1,0,1 | -1,0,1 | -1,0,1 | -2,-1,0 | 27 | 16 | 43 | 0.460 | Unsatisfied | Satisfied | Unsatisfied |
| 18 Redesigns | -1,0,1 | -1,0,1 | -1,0,1 | -1,0,1 | -2,-1,0 | 27 | 18 | 45 | 0.402 | Unsatisfied | Satisfied | Unsatisfied |
| 19 Redesigns | -1,0,1 | -1,0,1 | -1,0,1 | -1,0,1 | -2,-1,0 | 27 | 19 | 46 | 0.391 | Unsatisfied | Satisfied | Unsatisfied |
| 20 Redesigns | -1,0,1 | -1,0,1 | -1,0,1 | -1,0,1 | -2,-1,0 | 27 | 20 | 47 | 0.371 | Satisfied | Satisfied | Satisfied |

FIG. 8A

| No. | Control factor (temperature) | | | | |
|---|---|---|---|---|---|
| | X1 | X2 | X3 | X4 | X5 |
| 1 | 1 | -1 | 1 | -1 | 1 |
| 2 | 1 | -1 | -1 | -1 | -1 |
| 3 | 1 | -1 | 1 | 1 | -1 |
| 4 | 0 | 0 | 0 | 1 | 1 |
| 5 | -1 | -1 | 1 | -1 | -1 |
| 6 | 1 | 1 | -1 | -1 | 1 |
| 7 | 0 | 1 | 1 | -1 | 1 |
| 8 | 1 | -1 | -1 | 1 | 1 |
| 9 | 0 | -1 | 0 | 0 | 0 |
| 10 | 0 | 0 | 1 | 1 | 0 |
| 11 | -1 | 0 | 0 | 0 | 1 |
| 12 | 1 | 1 | 0 | 1 | 0 |
| 13 | 1 | 1 | -1 | 1 | -1 |
| 14 | -1 | 1 | 0 | -1 | 0 |
| 15 | -1 | 1 | -1 | 1 | 1 |
| 16 | 0 | 0 | -1 | 0 | 0 |
| 17 | -1 | -1 | -1 | 1 | -1 |
| 18 | 1 | 0 | 0 | -1 | 0 |
| 19 | -1 | 1 | 1 | 1 | -1 |
| 20 | 1 | 1 | 1 | -1 | -1 |
| 21 | 0 | -1 | 0 | 0 | 0 |
| 22 | 0 | 0 | 0 | 0 | -1 |
| 23 | -1 | -1 | 1 | 1 | 1 |
| 24 | -1 | 1 | -1 | -1 | -1 |
| 25 | 1 | 1 | 1 | 0 | 1 |
| 26 | -1 | -1 | -1 | -1 | 1 |
| 27 | -1 | 0 | 1 | 0 | 0 |

FIG. 8B

| No. | Control factor (temperature) | | | | | Object variable (film tickness [mm]) |
|---|---|---|---|---|---|---|
| | X1 | X2 | X3 | X4 | X5 | |
| 1 | 1 | -1 | 1 | -1 | 1 | 4.2 |
| 2 | 1 | -1 | -1 | -1 | -1 | -0.2 |
| 3 | 1 | -1 | 1 | 1 | -1 | -0.7 |
| 4 | 0 | 0 | 0 | 1 | 1 | 4.4 |
| 5 | -1 | -1 | 1 | -1 | -1 | -0.9 |
| 6 | 1 | 1 | -1 | -1 | 1 | 5.7 |
| 7 | 0 | 1 | 1 | -1 | 1 | 4.2 |
| 8 | 1 | -1 | -1 | 1 | 1 | 4.7 |
| 9 | 0 | -1 | 0 | 0 | 0 | 1.3 |
| 10 | 0 | 0 | 1 | 1 | 0 | 1.6 |
| 11 | -1 | 0 | 0 | 0 | 1 | 4.7 |
| 12 | 1 | 1 | 0 | 1 | 0 | 1.7 |
| 13 | 1 | 1 | -1 | 1 | -1 | -0.2 |
| 14 | -1 | 1 | 0 | -1 | 0 | 1.2 |
| 15 | -1 | 1 | -1 | 1 | 1 | 5 |
| 16 | 0 | 0 | -1 | 0 | 0 | 1.5 |
| 17 | -1 | -1 | -1 | 1 | -1 | -0.3 |
| 18 | 1 | 0 | 0 | -1 | 0 | 1.5 |
| 19 | -1 | 1 | 1 | 1 | -1 | -0.8 |
| 20 | 1 | 1 | 1 | -1 | -1 | -0.6 |
| 21 | 0 | -1 | 0 | 0 | 0 | 1.3 |
| 22 | 0 | 0 | 0 | 0 | -1 | -1.1 |
| 23 | -1 | -1 | 1 | 1 | 1 | 5.2 |
| 24 | -1 | 1 | -1 | -1 | -1 | -0.6 |
| 25 | 1 | 1 | 1 | 0 | 1 | 5 |
| 26 | -1 | -1 | -1 | -1 | 1 | 5.5 |
| 27 | -1 | 0 | 1 | 0 | 0 | 1.6 |

FIG. 8C

| No. | Control factor (temperature) | | | | | Object variable (film tickness [mm]) |
|---|---|---|---|---|---|---|
| | X1 | X2 | X3 | X4 | X5 | |
| 1 | 1 | -1 | 1 | -1 | 1 | 4.2 |
| 2 | 1 | -1 | -1 | -1 | -1 | -0.2 |
| 3 | 1 | -1 | 1 | 1 | -1 | -0.7 |
| 4 | 0 | 0 | 0 | 1 | 1 | 4.4 |
| 5 | -1 | -1 | 1 | -1 | -1 | -0.9 |
| 6 | 1 | 1 | -1 | -1 | 1 | 5.7 |
| 7 | 0 | 1 | 1 | -1 | 1 | 4.2 |
| 8 | 1 | -1 | -1 | 1 | 1 | 4.7 |
| 9 | -1 | 0 | 0 | 0 | 1 | 4.7 |
| 10 | 1 | 1 | -1 | 1 | -1 | -0.2 |
| 11 | -1 | 1 | -1 | 1 | 1 | 5 |
| 12 | -1 | -1 | -1 | 1 | -1 | -0.3 |
| 13 | -1 | 1 | 1 | 1 | -1 | -0.8 |
| 14 | 1 | 1 | 1 | -1 | -1 | -0.6 |
| 15 | 0 | 0 | 0 | 0 | -1 | -1.1 |
| 16 | -1 | -1 | 1 | 1 | 1 | 5.2 |
| 17 | -1 | 1 | -1 | -1 | -1 | -0.6 |
| 18 | 1 | 1 | 1 | 0 | 1 | 5 |
| 19 | -1 | -1 | -1 | -1 | 1 | 5.5 |

FIG. 8D

| No. | Control factor (temperature) | | | | | Object variable (film tickness [mm]) |
|---|---|---|---|---|---|---|
| | X1 | X2 | X3 | X4 | X5 | |
| 1 | 1 | -1 | 1 | -1 | 1 | 4.2 |
| 2 | 1 | -1 | -1 | -1 | -1 | -0.2 |
| 3 | 1 | -1 | 1 | 1 | -1 | -0.7 |
| 4 | 0 | 0 | 0 | 1 | 1 | 4.4 |
| 5 | -1 | -1 | 1 | -1 | -1 | -0.9 |
| 6 | 1 | 1 | -1 | -1 | 1 | 5.7 |
| 7 | 0 | 1 | 1 | -1 | 1 | 4.2 |
| 8 | 1 | -1 | -1 | 1 | 1 | 4.7 |
| 9 | -1 | 0 | 0 | 0 | 1 | 4.7 |
| 10 | 1 | 1 | -1 | 1 | -1 | -0.2 |
| 11 | -1 | 1 | -1 | 1 | 1 | 5 |
| 12 | -1 | -1 | -1 | 1 | -1 | -0.3 |
| 13 | -1 | 1 | 1 | 1 | -1 | -0.8 |
| 14 | 1 | 1 | 1 | -1 | -1 | -0.6 |
| 15 | 0 | 0 | 0 | 0 | -1 | -1.1 |
| 16 | -1 | -1 | 1 | 1 | 1 | 5.2 |
| 17 | -1 | 1 | -1 | -1 | -1 | -0.6 |
| 18 | 1 | 1 | 1 | 0 | 1 | 5 |
| 19 | -1 | -1 | -1 | -1 | 1 | 5.5 |
| 20 | 1 | -1 | -1 | -1 | -3 | |
| 21 | 0 | -1 | 1 | -1 | -3 | |
| 22 | 1 | 1 | 1 | 1 | 1 | |
| 23 | -1 | 1 | -1 | 1 | -3 | |
| 24 | 1 | -1 | 0 | -1 | 1 | |
| 25 | 1 | -1 | 1 | 0 | -3 | |
| 26 | -1 | -1 | 0 | -1 | -3 | |
| 27 | 1 | -1 | 0 | 1 | -3 | |
| 28 | 1 | 0 | -1 | 1 | -3 | |
| 29 | 1 | 1 | 1 | 1 | -3 | |
| 30 | 1 | 1 | -1 | 0 | -3 | |
| 31 | -1 | 1 | 1 | -1 | 1 | |
| 32 | 0 | -1 | -1 | 0 | 1 | |
| 33 | -1 | 0 | -1 | -1 | -3 | |
| 34 | -1 | 0 | 1 | 1 | -3 | |
| 35 | 1 | 1 | 0 | -1 | -3 | |
| 36 | -1 | -1 | -1 | 1 | -3 | |
| 37 | 1 | 0 | 1 | -1 | -3 | |
| 38 | -1 | 1 | 1 | -1 | -3 | |
| 39 | 0 | 1 | -1 | -1 | -3 | |

FIG. 8E

| No. | Control factor (temperature) | | | | | Object variable (film tickness [mm]) |
|---|---|---|---|---|---|---|
| | X1 | X2 | X3 | X4 | X5 | |
| 1 | 1 | -1 | 1 | -1 | 1 | 4.2 |
| 2 | 1 | -1 | -1 | -1 | -1 | -0.2 |
| 3 | 1 | -1 | 1 | 1 | -1 | -0.7 |
| 4 | 0 | 0 | 0 | 1 | 1 | 4.4 |
| 5 | -1 | -1 | 1 | -1 | -1 | -0.9 |
| 6 | 1 | 1 | -1 | -1 | 1 | 5.7 |
| 7 | 0 | 1 | 1 | -1 | 1 | 4.2 |
| 8 | 1 | -1 | -1 | 1 | 1 | 4.7 |
| 9 | -1 | 0 | 0 | 0 | 1 | 4.7 |
| 10 | 1 | 1 | -1 | 1 | -1 | -0.2 |
| 11 | -1 | 1 | -1 | 1 | 1 | 5 |
| 12 | -1 | -1 | -1 | 1 | -1 | -0.3 |
| 13 | -1 | 1 | 1 | 1 | -1 | -0.8 |
| 14 | 1 | 1 | 1 | -1 | -1 | -0.6 |
| 15 | 0 | 0 | 0 | 0 | -1 | -1.1 |
| 16 | -1 | -1 | 1 | 1 | 1 | 5.2 |
| 17 | -1 | 1 | -1 | -1 | -1 | -0.6 |
| 18 | 1 | 1 | 1 | 0 | 1 | 5 |
| 19 | -1 | -1 | -1 | -1 | 1 | 5.5 |
| 20 | 1 | -1 | -1 | -1 | -3 | -1.4 |
| 21 | 0 | -1 | 1 | -1 | -3 | -2.3 |
| 22 | 1 | 1 | 1 | 1 | 1 | 5.2 |
| 23 | -1 | 1 | -1 | 1 | -3 | -2.1 |
| 24 | 1 | -1 | 0 | -1 | 1 | 4.6 |
| 25 | 1 | -1 | 1 | 0 | -3 | -2.1 |
| 26 | -1 | -1 | 0 | -1 | -3 | -1.8 |
| 27 | 1 | -1 | 0 | 1 | -3 | -2.1 |
| 28 | 1 | 0 | -1 | 1 | -3 | -1.7 |
| 29 | 1 | 1 | 1 | 1 | -3 | -1.2 |
| 30 | 1 | 1 | -1 | 0 | -3 | -1.3 |
| 31 | -1 | 1 | 1 | -1 | 1 | 4.3 |
| 32 | 0 | -1 | -1 | 0 | 1 | 5 |
| 33 | -1 | 0 | -1 | -1 | -3 | -1.4 |
| 34 | -1 | 0 | 1 | 1 | -3 | -1.7 |
| 35 | 1 | 1 | 0 | -1 | -3 | -1.7 |
| 36 | -1 | -1 | -1 | 1 | -3 | -1.7 |
| 37 | 1 | 0 | 1 | -1 | -3 | -2.2 |
| 38 | -1 | 1 | 1 | -1 | -3 | -2.4 |
| 39 | 0 | 1 | -1 | -1 | -3 | -1.3 |

FIG. 8F

| Design | Level of parameter | | | | | Number of designs | | | Vail_ADD | | | Overall |
|---|---|---|---|---|---|---|---|---|---|---|---|---|
| | X1 | X2 | X3 | X4 | X5 | Initial | Addition | Total | Evaluation | Determination | Optimum value | |
| 27 Initial designs | -1,0,1 | -1,0,1 | -1,0,1 | -1,0,1 | -1,0,1 | 27 | - | 27 | 0.391 | - | Unsatisfied | Unsatisfied |
| 27 Redesigns | -1,0,1 | -1,0,1 | -1,0,1 | -1,0,1 | -3,-1,1 | 27 | 27 | 54 | 0.391 | - | Satisfied | Satisfied |

FIG. 8G

| Design | Level of parameter | | | | | Number of designs | | | Vail_ADD | | Optimum value | Overall |
|---|---|---|---|---|---|---|---|---|---|---|---|---|
| | X1 | X2 | X3 | X4 | X5 | Initial | Addition | Total | Evaluation | Determination | | |
| 27 Initial designs | -1,0,1 | -1,0,1 | -1,0,1 | -1,0,1 | -1,0,1 | 27 | - | 27 | 0.391 | Reference (Vail_0) | Unsatisfied | Unsatisfied |
| 8 Redesigns | -1,0,1 | -1,0,1 | -1,0,1 | -1,0,1 | -3,-1,1 | 27 | 8 | 35 | 0.553 | Unsatisfied | Satisfied | Unsatisfied |
| 10 Redesigns | -1,0,1 | -1,0,1 | -1,0,1 | -1,0,1 | -3,-1,1 | 27 | 10 | 37 | 0.500 | Unsatisfied | Satisfied | Unsatisfied |
| 12 Redesigns | -1,0,1 | -1,0,1 | -1,0,1 | -1,0,1 | -3,-1,1 | 27 | 12 | 39 | 0.491 | Unsatisfied | Satisfied | Unsatisfied |
| 14 Redesigns | -1,0,1 | -1,0,1 | -1,0,1 | -1,0,1 | -3,-1,1 | 27 | 14 | 41 | 0.436 | Unsatisfied | Satisfied | Unsatisfied |
| 16 Redesigns | -1,0,1 | -1,0,1 | -1,0,1 | -1,0,1 | -3,-1,1 | 27 | 16 | 43 | 0.431 | Unsatisfied | Satisfied | Unsatisfied |
| 18 Redesigns | -1,0,1 | -1,0,1 | -1,0,1 | -1,0,1 | -3,-1,1 | 27 | 18 | 45 | 0.393 | Unsatisfied | Satisfied | Unsatisfied |
| 19 Redesigns | -1,0,1 | -1,0,1 | -1,0,1 | -1,0,1 | -3,-1,1 | 27 | 19 | 46 | 0.394 | Unsatisfied | Satisfied | Unsatisfied |
| 20 Redesigns | -1,0,1 | -1,0,1 | -1,0,1 | -1,0,1 | -3,-1,1 | 27 | 20 | 47 | 0.385 | Satisfied | Satisfied | Satisfied |

# INFORMATION PROCESSING METHOD, NON-TRANSITORY COMPUTER READABLE MEDIUM HAVING RECORDED THEREON PROGRAM, AND INFORMATION PROCESSING DEVICE

BACKGROUND

1. Technical Field

The present disclosure relates to an information processing method for designing process parameters, a non-transitory computer readable medium having recorded thereon a program for causing a computer to execute the information processing method, and an information processing device for designing process parameters.

2. Description of the Related Art

In recent years, it is required to set multiple process parameters (also referred to as control parameters) for various control targets due to complexity of a control process. For example, it is required to optimize and practice multiple control parameters in automobile engine control, semiconductor device manufacturing, chemical producing, or the like. In order to set such control parameters, search for optimum conditions of the control parameter for each control target is performed using an experimental design method.

Here, for example, in a method of setting an experimental design of the control parameter of an engine, normal data may not be obtained due to misfire of a vehicle engine. Even if there are missing points due to misfire of a vehicle engine or the like as described above, a method of efficiently securing accuracy in each characteristic model by performing the small number of additional experiments while utilizing normal data obtained in the experiments, is known (for example, see Japanese Patent Unexamined Publication No. 2006-17698).

Here, when the number of control parameters increases, the number of experimental candidate points increases rapidly. For example, when the number of control parameters is five, the number of experimental points in a central composite design is 29, and when 5 levels are set for each parameter, the total candidate points are $5^5 - 29 = 3,096$. Then, when 6 additional experimental points instead of the missing points are selected in a case where three points of 29 experimental points in the central composite design are missed, 6 points of the 3,096 candidate points need to be selected and combined, that is, one of $3096C6 = 10^{18}$ needs to be selected. The combination further increases when the number of control parameters reaches 6.

To solve such a problem, a setting method of an experimental design for control parameters capable of setting additional experimental points efficiently and accurately has been devised (for example, see Japanese Patent Unexamined Publication No. 2008-241337). The setting method of an experimental design disclosed in Japanese Patent Unexamined Publication No. 2008-241337 includes a step of determining whether or not a missing point exists in a first predetermined number of experimental points, and a step of setting a second predetermined number of additional experimental points. Regarding how a plurality of control parameters are changed with reference to the missing point, a plurality of searching directions are previously assigned to a plurality of priorities. The step of setting the additional experimental points includes a step of applying the plurality of searching directions in a descending order of the priorities and setting a candidate point of the additional experimental points until the control parameter of the missing point is changed to have the required number, and a step of selecting an additional experimental point of the required number of candidate points. As a result, an additional experimental point can be set efficiently and accurately.

SUMMARY

According to an aspect of the present disclosure, an information processing method includes: creating, by an experimental design method, a first table showing a plurality of combinations of experimental conditions for each of a plurality of control factors for obtaining an object variable by an experiment, the creating being performed based on a plurality of level values including a first level value, a second level value larger than the first level value, and a third level value larger than the second level value which are set for each of the plurality of control factors including a first control factor; recording, in the first table, an object variable acquired based on the created first table; calculating a first response surface related to the object variable for the plurality of control factors using the first table in which the object variable is recorded; setting a fourth level value which is different from the first level value, the second level value, and the third level value for the first control factor, when the calculated first response surface does not include a target value related to the object variable for the first control factor; creating, by the experimental design method, a second table showing a plurality of combinations of the experimental conditions for each of the plurality of control factors, by (i) deleting at least one combination of the experimental conditions which include at least one level value of the first level value, the second level value, and the third level value which are for the first control factor from the first table in which the object variable is recorded, and (ii) adding at least one combination of the experimental conditions for each of the plurality of control factors based on the plurality of level values including the fourth level value and without including the deleted one level value for the first control factor to the first table; recording, in the second table, an object variable acquired based on the second table; calculating a second response surface related to the object variable and including the target value for the plurality of control factors using the second table in which the object variable is recorded; and outputting the calculated second response surface.

According to another aspect of the present disclosure, an information processing device includes: a processor; and a memory, in which by executing a program stored in the memory, the processor creates, by an experimental design method, a first table showing a plurality of combinations of experimental conditions for each of a plurality of control factors for obtaining an object variable by an experiment, based on a plurality of level values including a first level value, a second level value larger than the first level value, and a third level value larger than the second level value which are set for each of the plurality of control factors including a first control factor, records, in the first table an object variable acquired based on the created first table, calculates a first response surface related to the object variable for the plurality of control factors using the first table in which the object variable is recorded, sets a fourth level value which is different from the first level value, the second level value, and the third level value for the first control factor, when the calculated first response surface does not include a target value related to the object variable for the first control factor, creates, by the experimental design method, a second table showing a plurality of combinations of the experimental conditions for each of the plurality of control factors, by deleting at least one combination of the experimental conditions which include at least one level value of the first level value, the second level value, and the third level value which are for the first control factor from the first table in which the object variable is recorded, and adding at least one combination of the experimental conditions for each of the plurality of control factors based on the plurality of level values including the set fourth level value and without including the deleted one level value for the first control factor to the first table, records, in the second table, an object variable acquired based on the second table, calculates a second response surface related to the object variable and including the target value for the plurality of control factors using the second table in which the object variable is recorded, and outputs the calculated second response surface.

BRIEF DESCRIPTION OF THE DRAWINGS

FIG. 5A is a table showing a first example of a first table created by an experimental design method;

FIG. 5B is a table showing the first example of the first table in which the object variable is recorded;

FIG. 5C is a table showing the first example of a table in which a combination of experimental conditions including one level value for a first control factor is deleted from the first table illustrated in FIG. 5B;

FIG. 5D is a table showing the first example of a second table that is created by adding a combination of experimental conditions including a fourth level value for a first control factor and without including one level value to the table illustrated in FIG. 5C;

FIG. 5E is a table showing the first example of the second table in which the object variable is recorded;

FIG. 5F is a table showing the number of experimental designs when a highly accurate experimental design is obtained in a comparative example;

FIG. 5G is a table showing the number of experimental designs until a highly accurate experimental design is obtained in the first example;

FIG. 6A is a table showing a second example of a first table created by an experimental design method;

FIG. 6B is a table showing the second example of the first table in which the object variable is recorded;

FIG. 6C is a table showing the second example of a table in which a combination of experimental conditions including one level value for a first control factor is deleted from the first table illustrated in FIG. 6B;

FIG. 6D is a table showing the second example of the second table that is created by adding a combination of experimental conditions including a fourth level value for a first control factor and without including one level value to the table illustrated in FIG. 6C;

FIG. 6E is a table showing the second example of the second table in which the object variable is recorded;

FIG. 6F is a table showing the number of experimental designs when a highly accurate experimental design is obtained in a comparative example;

FIG. 6G is a table showing the number of experimental designs until a highly accurate experimental design is obtained in the second example;

FIG. 7A is a table showing a third example of a first table created by an experimental design method;

FIG. 7B is a table showing the third example of the first table in which the object variable is recorded;

FIG. 7C is a table showing the third example of a table in which a combination of experimental conditions including one level value for a first control factor is deleted from the first table illustrated in FIG. 7B;

FIG. 7D is a table showing the third example of a second table that is created by adding a combination of experimental conditions including a fourth level value for a first control factor and without including one level value to the table illustrated in FIG. 7C;

FIG. 7E is a table showing a third example of the second table in which the object variable is recorded;

FIG. 7F is a table showing the number of experimental designs when a highly accurate experimental design is obtained in a comparative example;

FIG. 7G is a table showing the number of experimental designs until a highly accurate experimental design is obtained in the third example;

FIG. 8A is a table showing a fourth example of a first table created by an experimental design method;

FIG. 8B is a table showing the fourth example of the first table in which the object variable is recorded;

FIG. 8C is a table showing the fourth example of a table in which a combination of experimental conditions including one level value for a first control factor is deleted from the first table illustrated in FIG. 8B;

FIG. 8D is a table showing the fourth example of a second table that is created by adding a combination of experimental conditions including a fourth level value for a first control factor and without including one level value to the table illustrated in FIG. 8C;

FIG. 8E is a table showing the fourth example of the second table in which the object variable is recorded;

FIG. 8F is a table showing the number of experimental designs when a highly accurate experimental design is obtained in a comparative example; and FIG. 8G is a table showing the number of experimental designs until a highly accurate experimental design is obtained in the fourth example.

DETAILED DESCRIPTIONS

Figure 1:
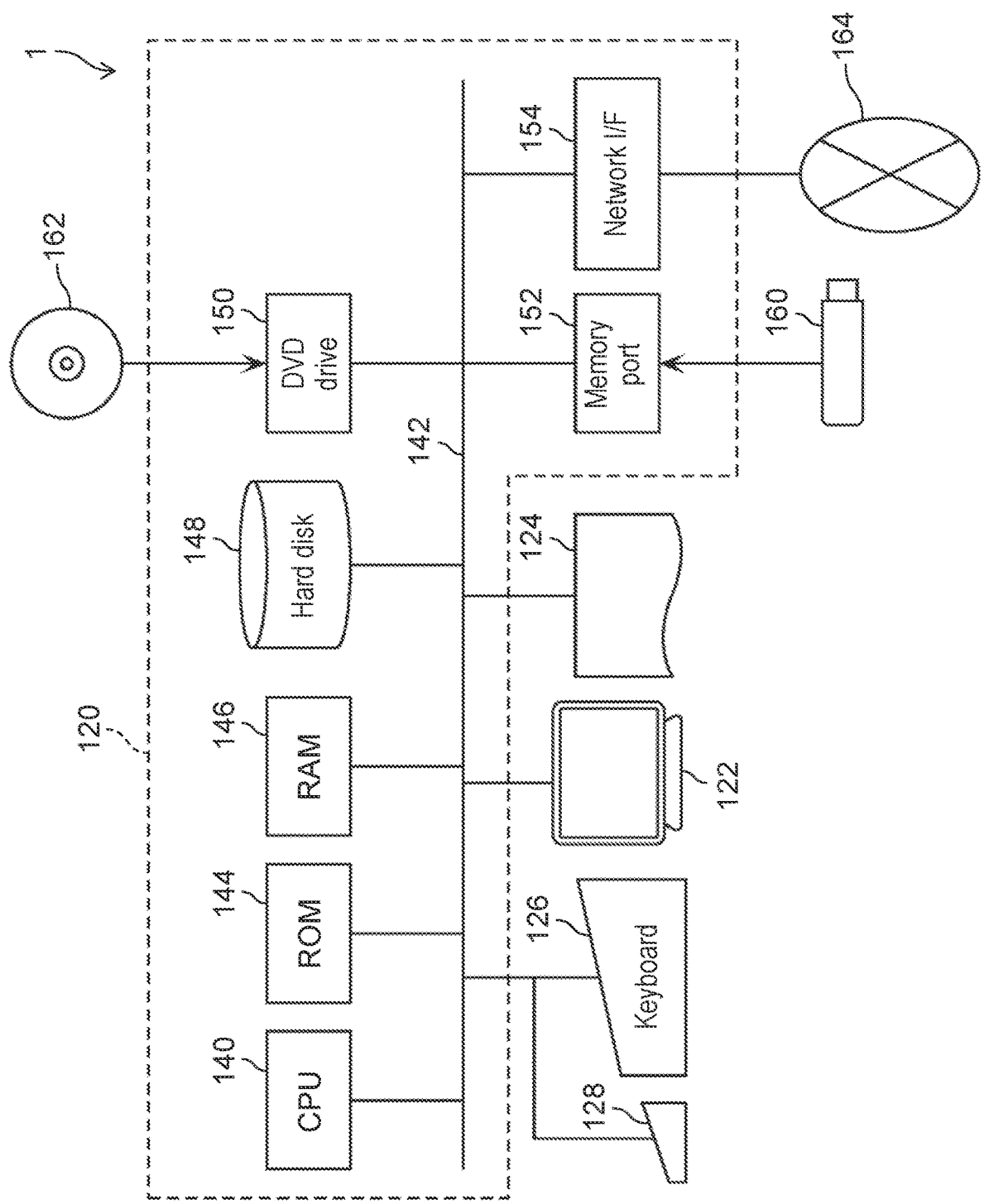
FIG. 1 is a configuration diagram illustrating an example of an information processing device according to an exemplary embodiment.

In the methods of the related art disclosed in Japanese Patent Unexamined Publication No. 2006-17698 and Japanese Patent Unexamined Publication No. 2008-241337, it is premised that the process is understood to some extent and there are thus few experimental points that are difficult to measure.

On the other hand, in a case of the complicated process, when an experimental range is set to be sufficiently large, it may be difficult to measure a large number of experimental points, and additional experimental points may become huge. In addition, when the experimental range is set to be small, optimum conditions cannot be obtained within the created response surface, and the experimental design needs to be created again in order to study outside the experimental range.

An object of the present disclosure is to provide an information processing method, a program, and an information processing device capable of efficiently setting an experimental design for a complicated process.

According to an aspect of the present disclosure, an information processing method includes: creating, by an experimental design method, a first table showing a combination of experimental conditions for each of a plurality of control factors for obtaining an object variable by an experiment, based on a plurality of level values including a first level value, a second level value larger than the first level value, and a third level value larger than the second level value which are set for each of the plurality of control factors including a first control factor; recording an object variable acquired based on the created first table in the first table; calculating a first response surface related to the object variable for the plurality of control factors using the first table in which the object variable is recorded; setting a fourth level value which is different from the set first level value, second level value, and third level value for the first control factor, when the calculated first response surface does not include a target value related to the object variable for the first control factor; creating, by the experimental design method, a second table showing a combination of the experimental conditions for each of the plurality of control factors, by (i) deleting the combination of the experimental conditions which include at least one level value of the set first level value, second level value, and third level value for the first control factor from the first table in which the object variable is recorded, and (ii) adding a combination of the experimental conditions for each of the plurality of control factors based on the plurality of level values including the set fourth level value and without including the deleted one level value for the first control factor to the first table; recording an object variable acquired based on the created second table in the second table; calculating a second response surface related to the object variable and including the target value for the plurality of control factors using the second table in which the object variable is recorded; and outputting the calculated second response surface.

For example, in the initial experimental design using the first table created based on a plurality of level values including the first level value, the second level value, and the third level value, when the first response surface does not include the target value related to the object variable (that is, experimental result is not obtained as desired), there is a problem with at least one level value of the first level value, the second level value, and the third level value for the first control factor, and it was found that the fourth level value is required. In this case, when the experiment is restarted by adding the fourth level value for the first control factor instead of the one level value, the number of experimental designs increases, resulting in inefficiency. On the other hand, in the experimental design using the second table, when the combination of the experimental conditions including one level value for the first control factor is deleted from the first table, the experiment for the remaining combination of the experimental conditions is not restarted, and a redesign is performed on an experiment for the combination of the experimental conditions including the fourth level value for the first control factor and without including the one level value. As a result, the desired experimental result can be obtained with a small number of redesigns. Therefore, according to the present disclosure, it is possible to efficiently set an experimental design for a complicated process.

For example, when a level value corresponding to the target value is smaller than the first level value, and a distance between the level value corresponding to the target value and the first level value is equal to or larger than a difference between the second level value and the first level value, the combination of the experimental conditions including the second level value for the first control factor as the one level value may be deleted from the first table in which the object variable is recorded, and a value smaller than the level value corresponding to the target value may be set as the fourth level value. When the level value corresponding to the target value is smaller than the first level value, and the distance between the level value corresponding to the target value and the first level value is smaller than the difference between the second level value and the first level value, the combination of the experimental conditions including the third level value for the first control factor as the one level value may be deleted from the first table in which the object variable is recorded, and a value smaller than the level value corresponding to the target value may be set as the fourth level value. When the level value corresponding to the target value is larger than the third level value, and a distance between the level value corresponding to the target value and the third level value is equal to or larger than a difference between the third level value and the second level value, the combination of the experimental conditions including the second level value for the first control factor as the one level value may be deleted from the first table in which the object variable is recorded, and a value larger than the level value corresponding to the target value is set as the fourth level value. When the level value corresponding to the target value is larger than the third level value, and the distance between the level value corresponding to the target value and the third level value is smaller than the difference between the third level value and the second level value, the combination of the experimental conditions including the first level value for the first control factor as the one level value may be deleted from the first table in which the object variable is recorded, and a value larger than the level value corresponding to the target value may be set as the fourth level value.

Accordingly, one level value and the fourth level value can be determined, based on a size relation between the level value corresponding to the target value related to the object variable and the first level value or the third level value, and the distance between the level value corresponding to the target value related to the object variable and the first level value or the third level value.

For example, the combination of the experimental conditions when the second table is created may be added until a value of an average prediction variance calculated for the second table is smaller than a value of an average prediction variance calculated for the first table.

Accordingly, since the calculated value of the average prediction variance for the second table is smaller than the value of the average prediction variance calculated for the first table, the experimental design can be set efficiently and accurately in the experimental design using the second table.

For example, the first table may be created based on a central composite design method.

According to this, by using the central composite design method as the experimental design method, it is possible to set the experimental design more efficiently.

According to still another aspect of the present disclosure, there is provided a program for causing a computer to execute the information processing method.

According to still another aspect of the present disclosure, a non-transitory computer readable medium stores the program.

Accordingly, it is possible to provide a program capable of efficiently setting an experimental design for a complicated process.

According to another aspect of the present disclosure, an information processing device includes: a processor; and a memory, in which by executing a program stored in the memory, the processor creates, by an experimental design method, a first table showing a combination of experimental conditions for each of a plurality of control factors for obtaining an object variable by an experiment, based on a plurality of level values including a first level value, a second level value larger than the first level value, and a third level value larger than the second level value which are set for each of the plurality of control factors including a first control factor, records an object variable acquired based on the created first table in the first table, calculates a first response surface related to the object variable for the plurality of control factors using the first table in which the object variable is recorded, sets a fourth level value which is different from the set first level value, second level value, and third level value for the first control factor, when the calculated first response surface does not include a target value related to the object variable for the first control factor, creates, by the experimental design method, a second table showing a combination of the experimental conditions for each of the plurality of control factors, by deleting a combination of the experimental conditions which include at least one level value of the set first level value, second level value, and third level value for the first control factor from the first table in which the object variable is recorded, and adding a combination of the experimental conditions for each of the plurality of control factors based on the plurality of level values including the set fourth level value and without including the deleted one level value for the first control factor to the first table, records an object variable acquired based on the created second table in the second table, calculates a second response surface related to the object variable and including the target value for the plurality of control factors using the second table in which the object variable is recorded, and outputs the calculated second response surface.

Accordingly, it is possible to provide an information processing device capable of efficiently setting an experimental design for a complicated process.

The general and specific aspects may be implemented using a system, a method, an integrated circuit, a computer program, or a computer-readable recording medium such as CD-ROM, or any combination of systems, methods, integrated circuits, computer programs, or recording media.

Hereinafter, exemplary embodiments will be described in detail with reference to the drawings.

The exemplary embodiments described below show a general or specific example. Numerical values, shapes, materials, components, arrangement positions and connection modes of the components, steps, order of steps, and the like described in the following exemplary embodiments are merely examples, and therefore are not intended to limit the present disclosure.

Exemplary Embodiments

Device

FIG. 1 is a configuration diagram illustrating an example of information processing device 1 according to an exemplary embodiment. FIG. 1 illustrates semiconductor memory 160, digital versatile disk read only memory (DVD ROM) 162, and network 164, in addition to information processing device 1.

Information processing device 1 according to the exemplary embodiment can be implemented as a program executed on computer system hardware and a computer system. Information processing device 1 illustrated herein is merely an example, and can be implemented as other configurations.

Referring to FIG. 1, information processing device 1 includes computer 120, monitor 122, keyboard 126, mouse 128, and printer 124. All of keyboard 126, monitor 122, mouse 128, and printer 124 are connected to computer 120. Information processing device 1 may not include monitor 122, printer 124, keyboard 126, and mouse 128.

Computer 120 includes DVD drive 150 and semiconductor memory port 152.

As illustrated in FIG. 1, computer 120 further includes bus 142 connected to DVD drive 150 and semiconductor memory port 152, CPU 140, and ROM 144 for storing a boot up program of computer 120. All of CPU 140 and ROM 144 are connected to bus 142.

Computer 120 further includes RAM 146 as a storage area for a program providing a work area used by CPU 140 and executed by CPU 140, hard disk drive 148 for storing initial experimental design data, experiment data, simulation data, additional experimental design data, optimum point setting data, optimal calculation point, and the like, and network interface 154 providing connection with network 164.

Software for implementing information processing device 1 according to the exemplary embodiment may be stored in hard disk drive 148 which is distributed in a form of an object code or script and stored in a medium such as DVD ROM 162 or semiconductor memory 160, and provided in computer 120 via a reading device such as DVD drive 150 or semiconductor memory port 152. When CPU 140 executes the program, the program is read from hard disk drive 148 and loaded into RAM 146. An instruction is fetched from an address specified by a program counter (not illustrated) and the instruction is executed. CPU 140 reads data to be processed from hard disk drive 148, and stores the processing result in hard disk drive 148. An optimized combination of experimental conditions is output from printer 124.

Since the general operation of computer 120 is well known, detailed descriptions thereof will be omitted.

Regarding a method of distributing the software, the software does not necessarily have to be fixed on a recording medium. For example, the software may be distributed from another computer connected to network 164. Apart of the software may be stored in hard disk drive 148, and the remaining part of the software may be loaded into hard disk drive 148 via network 164 and integrated at the time of execution.

Moreover, the distribution form of software is not limited to an object code. The distribution form of software may be a script as described above, or a distribution form in which it may be supplied in a form of a source program to convert an appropriate compiler installed in computer 120 into an object code.

Typically, modern computers utilize general functions provided by a computer operating system (OS) to achieve the functions in a controlled manner according to the desired purpose. Therefore, even if the program does not include general functions that can be provided by the OS or a third party and specifies only a combination of execution orders of general functions, it is clear that the program is included in the scope of the disclosure as long as the program has a control structure that achieves the desired purpose as a whole.

Flow

Next, an operation of information processing device 1 according to the exemplary embodiment will be described with reference to FIG. 2.

Figure 2:
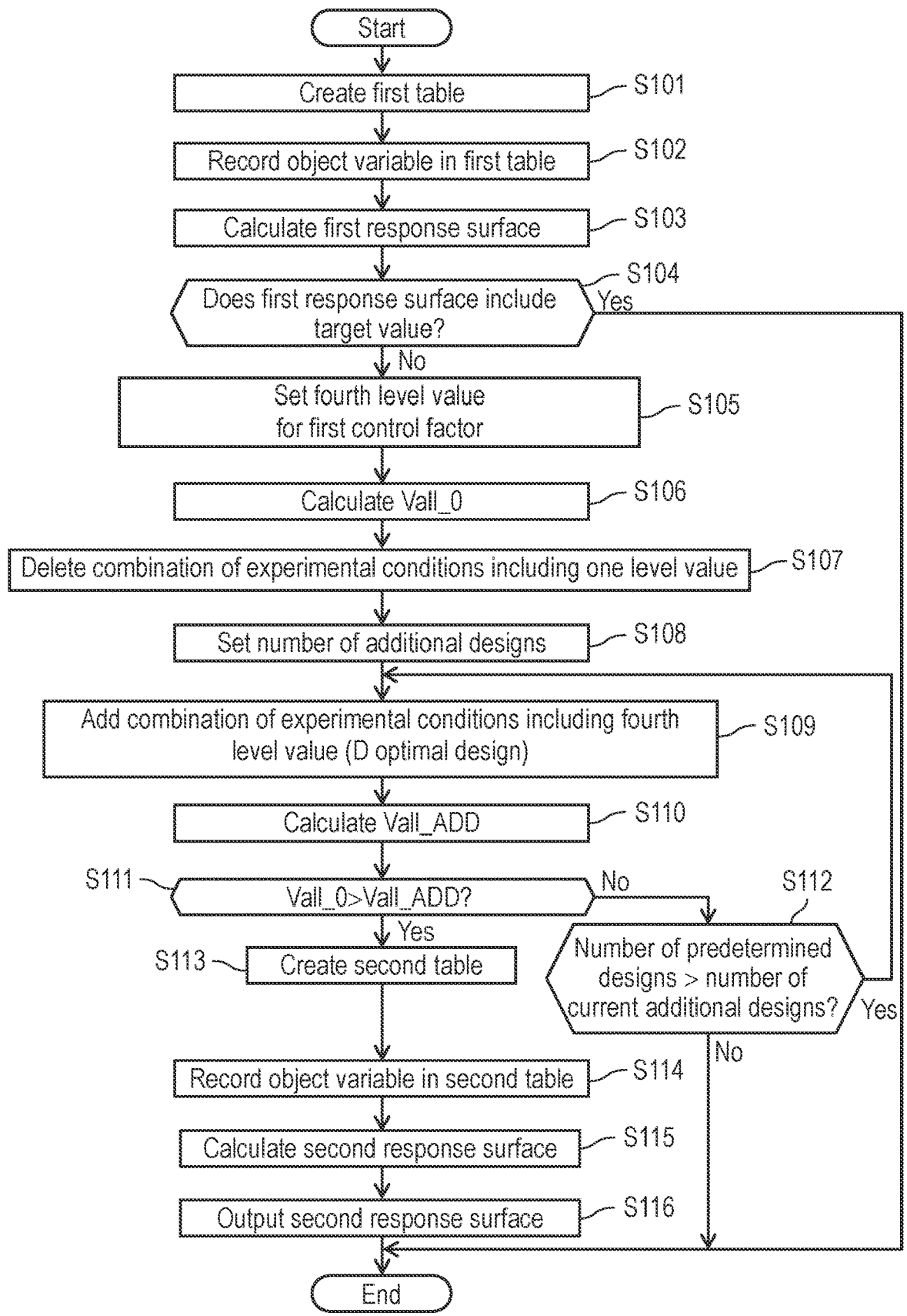
FIG. 2 is a flowchart illustrating an example of an information processing method according to an exemplary embodiment.

FIG. 2 is a flowchart illustrating an example of an information processing method according to the exemplary embodiment. FIG. 2 is a flowchart illustrating an example of the operation of information processing device 1 because the information processing method is executed by information processing device 1 (computer 120, specifically, processor (CPU 140)).

S101

First, in step S101, information processing device 1 creates, by an experimental design method, a first table showing a combination of experimental conditions for each of a plurality of control factors for obtaining an object variable by an experiment, based on a plurality of level values including a first level value, a second level value larger than the first level value, and a third level value larger than the second level value which are set for each of the plurality of control factors including a first control factor. The experimental design method classically has various designs such as an orthogonal design method, a central composite design method, and a space filling design method according to the purpose. The orthogonal design method is weak in interaction, and the space filling design method tends to increase the number of experiments. It is assumed that in the complicated process, the interaction becomes strong and a time is required for the experiment or simulation. Therefore, the first table is created based on the central composite design method in the present exemplary embodiment.

The control factor is a controllable process parameter or design parameter, for example, a parameter such as a temperature, a humidity, a pressure, a speed, and the like. The level value is a value set for the control factor. For example, when the control factor is a temperature, the level value includes 0° C., 100° C., and 200° C. For example, when a chamber temperature in a semiconductor film forming process is set as a control factor, an object variable thereof is a film thickness in the semiconductor. A specific example of the first table created in step S101 will be described later with reference to FIG. 5A and the like.

The first control factor is a control factor determined as a level value to be added from the plurality of control factors, and is not a predetermined control factor.

S102

Next, in step S102, information processing device 1 records an object variable acquired based on the created first table in the first table. For example, information processing device 1 adds an object variable acquired by the experiment or simulation based on the first table to the first table of a database (hereinafter, simply referred to as "DB") constructed in computer 120. A specific example of the first table in which the object variable is recorded will be described later in FIG. 5B and the like, and includes a combination of the experimental conditions for each of the plurality of control factors for obtaining the object variable by the experiment and the object variable which is an output at the time of the combination.

S103

Next, in step S103, information processing device 1 calculates a first response surface related to the object variable for the plurality of control factors using the first table in which the object variable is recorded.

S104

Next, in step S104, information processing device 1 determines whether or not the first control factor includes a target value related to the object variable (hereinafter, target value related to the object variable is referred to as a target value) in the calculated first response surface for the first control factor. The process will be described with reference to FIGS. 3A and 3B.

Figure 3A:
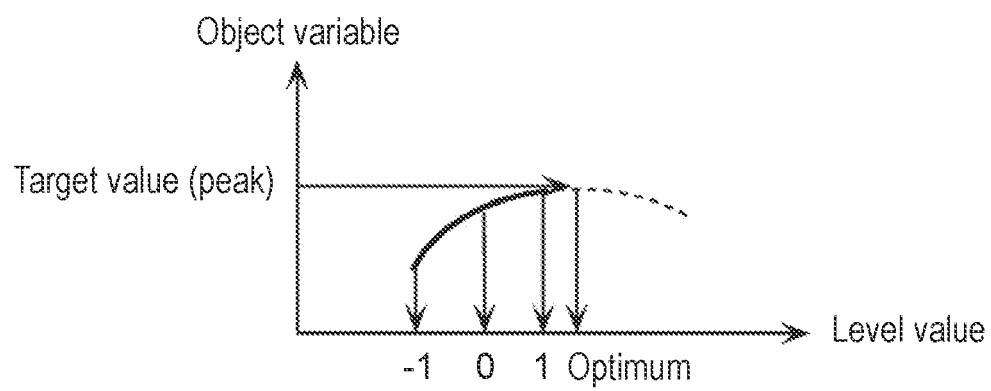
FIG. 3A is a diagram for explaining an example when a calculated first response surface does not include a target value related to an object variable.

FIG. 3A is a diagram for explaining an example when a calculated first response surface does not include the target value.

Figure 3B:
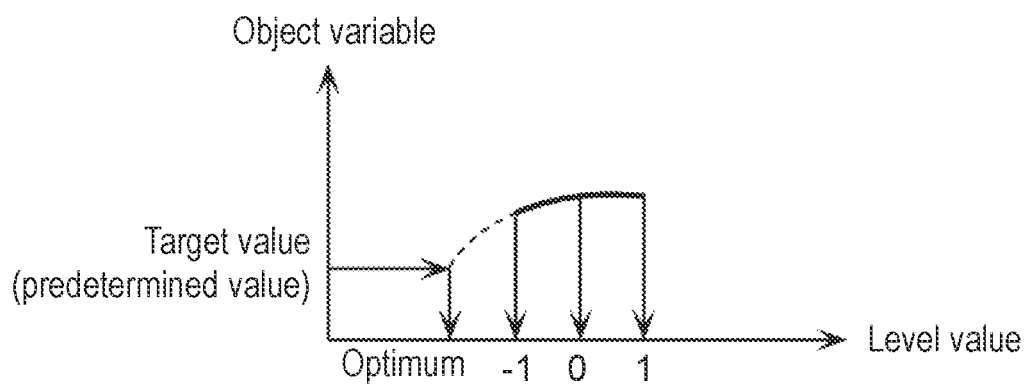
FIG. 3B is a diagram for explaining another example when a calculated first response surface does not include a target value related to an object variable.

FIG. 3B is a diagram for explaining another example when a calculated first response surface does not include the target value.

In FIGS. 3A and 3B, the first response surface is indicated by a solid line and a broken line. The solid line is the first response surface calculated using the first table in which the object variable is recorded, and the broken line is the first response surface estimated from the first table in which the object variable is recorded, in other words, the first response surface estimated from the calculated first response surface.

For example, setting of the optimum point is recorded in a memory of information processing device 1, and information processing device 1 calculates an optimum candidate point based on the first response surface calculated in step S103, and compares the setting of the recorded optimum point with the calculated optimum candidate point to determine a first control factor as a control factor which is optimal for implementing the optimum point from the plurality of the control factors. Information processing device 1 determines whether or not the calculated first response surface includes the target value for the first control factor. For example, the target value may be a peak of the first response surface or a predetermined value. FIG. 3A illustrates an optimum level value corresponding to the target value when the target value is the peak of the first response surface. FIG. 3B illustrates an optimum level value corresponding to the target value when the target value is a predetermined value. It can be seen that in both FIGS. 3A and 3B, the target value is not included in the calculated first response surface (solid line). When the calculated first response surface includes the target value (Yes in step S104), the flow ends because a desired experimental result is obtained in the initial experimental design. When the calculated first response surface does not include the target value (No in step S104), the process proceeds to step S105. The target value is not limited to the peak of the first response surface, but may be the bottom thereof, and the predetermined value may be 0.

S105

Next, in step S105, when the calculated first response surface does not include the target value for the first control factor, information processing device 1 sets a fourth level value which is different from the set first level value, second level value, and the third level value for the first control factor. For example, the first level value is −1, the second level value larger than the first level value is 0, and the third level value larger than the second level value is 1.

For example, when a level value corresponding to the target value (level value corresponding to the target value in the estimated first response surface) is smaller than the first level value (−1), and a distance between the level value corresponding to the target value and the first level value (−1) (absolute value of the difference) is equal to or larger than a difference (1) between the second level value (0) and the first level value (−1), information processing device 1 sets a value smaller than the level value corresponding to the target value as the fourth level value. For example, when the level value corresponding to the target value is −2.5, the fourth level value is set to a value smaller than −2.5 (for example, −3). A specific example thereof will be described later with reference to FIG. 8D.

For example, when a level value corresponding to the target value is smaller than the first level value (−1), and a distance between the level value corresponding to the target value and the first level value (−1) is smaller than a difference (1) between the second level value (0) and the first level value (−1), information processing device 1 sets a value smaller than the level value corresponding to the target value as the fourth level value. For example, when the level value corresponding to the target value is −1.5, the fourth level value is set to a value smaller than −1.5 (for example, −2). A specific example thereof will be described later with reference to FIG. 7D.

For example, when a level value corresponding to the target value is larger than the third level value (1), and a distance between the level value corresponding to the target value and the third level value (1) is equal to or larger than a difference (1) between the third level value (1) and the second level value (0), information processing device 1 sets a value larger than the level value corresponding to the target value as the fourth level value. For example, when the level value corresponding to the target value is 2.5, the fourth level value is set to a value larger than 2.5 (for example, 3). A specific example thereof will be described later with reference to FIG. 6D.

For example, when a level value corresponding to the target value is larger than the third level value (1), and a distance between the level value corresponding to the target value and the third level value (1) is smaller than a difference (1) between the third level value (1) and the second level value (0), information processing device 1 sets a value larger than the level value corresponding to the target value as the fourth level value. For example, when the level value corresponding to the target value is 1.5, the fourth level value is set to a value larger than 1.5 (for example, 2). A specific example thereof will be described later with reference to FIG. 5D.

Here, when the optimum candidate point is calculated in an extrapolation area in the calculated first response surface, accuracy as an extrapolation issue is not guaranteed. Therefore, when the fourth level value in modeling is −2 or 2, the optimum candidate point is present in the extrapolation area of −2 or smaller or 2 or larger, it may be required to extend the fourth value again. Therefore, the difference may be set to 0.5 instead of 1.

Although an example in which the fourth level value is set for one first control factor has been described here, the fourth level value may be set for two or more control factors.

Here, in the central composite design, the first level value for each control factor is set to −1, the second level value is set to 0, and the third level value is set to 1 as an initial design (hereinafter, the set level value may be expressed as (−1, 0, 1)) in some cases, and the fourth level value may be adopted as any one of −3, −2, 2, and 3, which is a level value outside of the optimum candidate point, in assumption of using the level value of the initial design as the maximum.

S106

Next, in step S106, information processing device 1 evaluates the accuracy in the experimental design in the initial experimental design. There are various indicators to evaluate the accuracy in the experimental design, but relatively good results can be obtained by using an average prediction variance. The average prediction variance of the first table in the initial experimental design will be referred to as Vall_0 hereafter.

S107

Next, in step S107, information processing device 1 deletes a combination of the experimental conditions including any one of the first level value, the second level value, and the third level value which are set for the first control factor, from the first table in which the object variable is recorded. For example, a part of the condition of the initial experimental design is deleted based on the determination on the first control factor and the fourth level value in step S105.

For example, when a level value corresponding to the target value is smaller than the first level value (−1), and the distance between the level value corresponding to the target value and the first level value (−1) is equal to or larger than the difference (1) between the second level value (0) and the first level value (−1), information processing device 1 deletes the combination of the experimental conditions including the second level value (0) as one level value for the first control factor from the first table in which the object variable is recorded. For example, when the level value corresponding to the target value is −2.5, one level value is the second level value (0). In this case, the level value set for the first control factor is the fourth level value (−3), and the first level value (−1) and the third level value (1), which means that an original distance of 1 between the level values of the first level value (−1) and the second level value (0) and the third level value (1) is larger than a distance of 2 between the level values (in other words, a setting interval of the level values becomes rough). A specific example thereof will be described later with reference to FIG. 8C.

For example, when a level value corresponding to the target value is smaller than the first level value (−1), and the distance between the level value corresponding to the target value and the first level value (−1) is smaller than the difference (1) between the second level value (0) and the first level value (−1), information processing device 1 deletes the combination of the experimental conditions including the third level value (1) as one level value for the first control factor from the first table in which the object variable is recorded. For example, when the level value corresponding to the target value is −1.5, one level value is the third level value (1). In this case, the level values set for the first control factor are the fourth level value (−2), and the first level value (−1) and the second level value (0), which means that the original level values are shifted by −1 from the first level value (−1), and the second level value (0) and the third level value (1) as a whole. A specific example thereof will be described later with reference to FIG. 7C.

For example, when a level value corresponding to the target value is larger than the third level value (1), and the distance between the level value corresponding to the target value and the third level value (1) is equal to or larger than the difference (1) between the third level value (1) and the second level value (0), information processing device 1 deletes the combination of the experimental conditions including the second level value (0) as one level value for the first control factor from the first table in which the object variable is recorded. For example, when the level value corresponding to the target value is 2.5, one level value is the second level value (0). In this case, the level value set for the first control factor is the first level value (−1), and the third level value (1) and the fourth level value (3), which means that an original distance of 1 between the level values of the first level value (−1) and the second level value (0) and the third level value (1) is larger than a distance of 2 between the level values. A specific example thereof will be described later with reference to FIG. 6C.

For example, when a level value corresponding to the target value is larger than the third level value (1), and the distance between the level value corresponding to the target value and the third level value (1) is smaller than the difference (1) between the third level value (1) and the second level value (0), information processing device 1 deletes the combination of the experimental conditions including the first level value (−1) as one level value for the first control factor from the first table in which the object variable is recorded. For example, when the level value corresponding to the target value is 1.5, one level value is the first level value (−1). In this case, the level values set for the first control factor are the second level value (0), and the third level value (1) and the fourth level value (2), which means that the original level values are shifted by +1 from the first level value (−1), and the second level value (0) and the third level value (1) as a whole. A specific example thereof will be described later with reference to FIG. 5C.

S108

Next, in step S108, information processing device 1 sets the number of designs to be added. For example, setting the number of designs excluded in step S107 as the number of designs to be added may be a good tendency in some cases.

S109

Next, in step S109, information processing device 1 adds a combination of experimental conditions including the fourth level value set for the first control factor and a plurality of level values without including one level value, to a table in which the combination of the experimental conditions including one level value for the first control factor is removed from the first table in which the object variable is recorded. As a method of determining a content of the combination of the experimental conditions to be added, there are various methods, such as a D optimal design or an I optimal design, depending on the purpose. The I optimal design places priority to minimization of a prediction variance in the entire design area, whereas the D optimal design places priority to reduction of a prediction variance at each design point. For example, since better results are often obtained when the design is determined by the D optimal design, the D optimal design is adopted here.

S110

Next, in step S110, information processing device 1 calculates an average prediction variance of an additional experimental design added by the combination of the experimental conditions, and evaluates accuracy in the additional experimental design using the average prediction variance as in the initial experimental design. Hereinafter, the average prediction variance of the additional experimental design is referred to as Vall_ADD.

S111

Next, in step S111, information processing device 1 evaluates the accuracy in the additional experimental design by determining whether or not Vall_0 exceeds Vall_ADD. Step S111 will be described with reference to FIG. 4.

Figure 4:
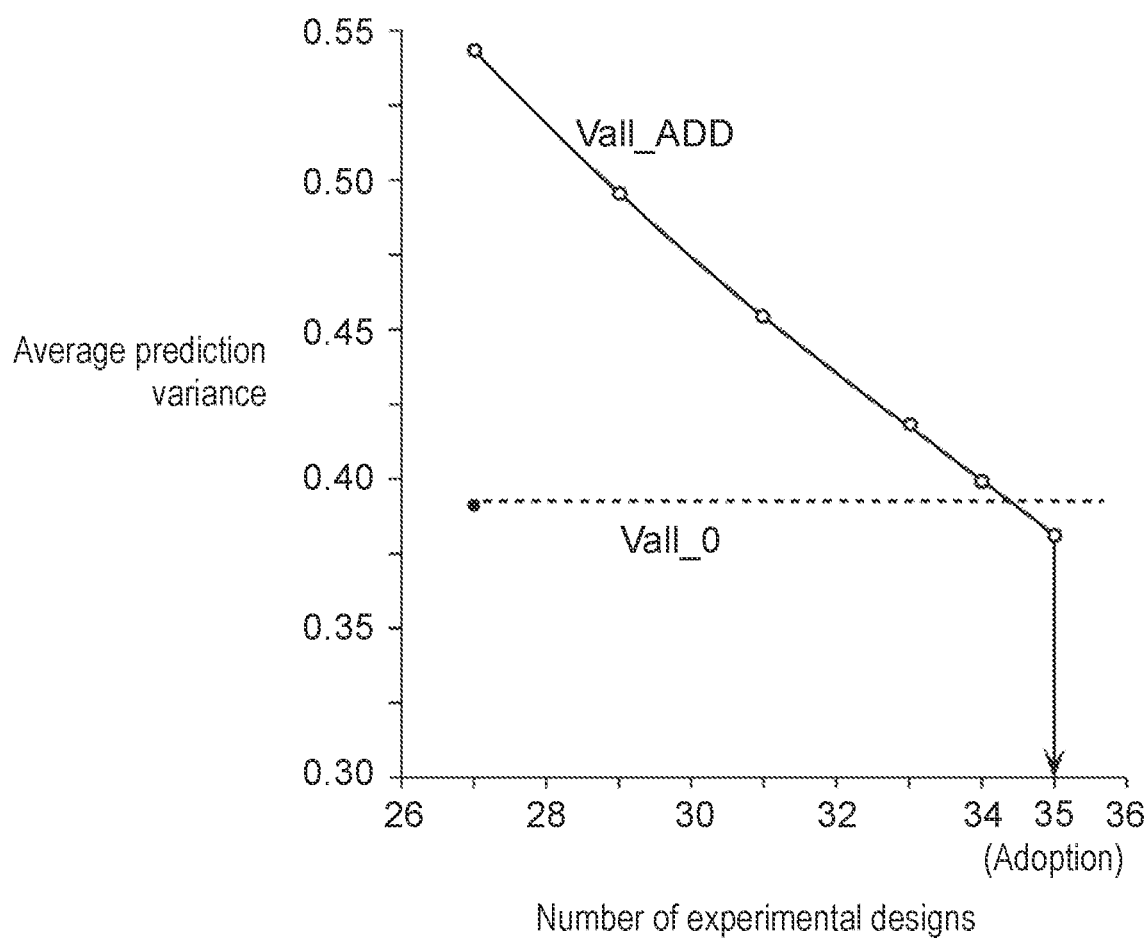
FIG. 4 is a diagram for explaining a method of adopting the number of experimental designs.

FIG. 4 is a diagram for explaining a method of adopting the number of experimental designs, specifically, a diagram for explaining a method of adopting the number of experimental designs when the additional experimental design has high accuracy.

As illustrated in FIG. 4, for the number of additional experimental designs, Vall_ADD decreases as the number of designs increases, for example, the number of designs is 35, such that it can be seen that Vall_ADD falls below Vall_0. When Vall_0 which indicates accuracy in the initial experimental design falls below Vall_ADD which indicates the accuracy in the additional experimental design, that is, Vall_0>Vall_ADD (Yes in step S111), information processing device 1 stops to add the combination of the experimental conditions, and the process proceeds to step S113. In addition, when Vall_0 is equal to or smaller than Vall_ADD, that is, Vall_0≤Vall_ADD (No in step S111), the process proceeds to step S112.

S112

When the number of current additional designs is equal to or larger than the number of predetermined designs (No in step S112), information processing device 1 ends the flow. For example, the number of predetermined designs is the number of designs of the first table (that is, the number of initial designs) in some cases. That is, when the number of additional designs exceeds the number of initial designs, the experimental design cannot be set efficiently, and the flow is terminated. When the number of current additional designs is smaller than the number of predetermined designs (Yes in step S112), information processing device 1 adds the combination of the experimental conditions by performing step S109 again. The combination of experimental conditions does not have to be added one by one, and a plurality of combinations may be added.

S113

Next, in step S113, information processing device 1 determines the content of the experiment to be added, and creates a second table showing the combination of the experimental conditions for each of the plurality of control factors by an experimental design method.

S114

Next, in step S114, information processing device 1 records an object variable acquired based on the created second table in the second table. A specific example of the second table in which the object variable is recorded will be described later with reference to FIG. 5E and the like.

S115

Next, in step S115, information processing device 1 calculates a second response surface including a target value and related to the object variable for the plurality of control factors using the second table in which the object variable is recorded.

S116

Then, information processing device 1 outputs the second response surface in step S116.

SPECIFIC EXAMPLES

Next, the present disclosure will be described with reference to specific examples. For example, a case where a temperature of each of a plurality of chambers is optimized in a semiconductor film forming process will be described. Each of X1, X2, X3, X4, and X5 to be described later is a control factor, specifically, a temperature of the chamber. For example, as level values, −3 is 60° C., −2 is 70° C., −1 is 80° C., 0 is 90° C., 1 is 100° C., 2 is 110° C., and 3 is 120° C. X5 corresponds to the first control factor among the plurality of control factors.

The object variable is a film thickness of a semiconductor.

FIGS. 5A to 5G are diagrams for explaining an example (first example) when the level value (−1, 0, 1) of X5 in the initial design is extended to (0, 1, 2).

FIG. 5A is a table showing a first example of the first table created by an experimental design method.

FIG. 5B is a table showing a first example of the first table in which the object variable is recorded.

FIG. 5C is a table showing a first example of a table in which a combination of experimental conditions including one level value for a first control factor is deleted from the first table illustrated in FIG. 5B.

FIG. 5D is a table showing a first example of a second table that is created by adding a combination of experimental conditions including a fourth level value for a first control factor and without including one level value to the table illustrated in FIG. 5C.

FIG. 5E is a table showing a first example of the second table in which the object variable is recorded.

FIG. 5F is a table showing the number of experimental designs when a highly accurate experimental design is obtained in a comparative example.

FIG. 5G is a table showing the number of experimental designs until a highly accurate experimental design is obtained in the first example.

FIG. 5A illustrates a first table created by an experimental design method (specifically, central composite design method), and the first table in which the object variable is recorded is a table illustrated in FIG. 5B. An average prediction variance Vall_0 of the first table is 0.391. For example, when the optimum value based on the response surface in the first table can be realized by a level value for X5 between 1 and 2, a table illustrated in FIG. 5C is created by deleting, from the first table illustrated in FIG. 5B, combination of experimental conditions including the first level value −1 for X5, in this case, combination of 9 experimental conditions Nos. 2, 3, 5, 13, 17, 19, 20, 22, and 24. A second table illustrated in FIG. 5D is created by adding, in the table illustrated in FIG. 5C, combination of experimental conditions including a fourth level value 2 for X5 and without including the first level value −1. In FIG. 5D, combination of the experimental conditions including the second level value 0 in addition to the fourth level value 2 for X5 is added, in order to prevent the level value from deviating from 2 which is a large value. Then, the object variable is recorded in the second table, and finally, the second table as illustrated in FIG. 5E is obtained.

In a case of the method of the related art as illustrated in a comparative example of FIG. 5F, the level values are redesigned, and in order to recreate the experimental design again, the total number of designs in a case of the method of the related art is 54. On the other hand, in a case of the method of the present disclosure as illustrated in FIG. 5G, the combination of the 9 experimental conditions is additionally added (extended) to 27, which is the number of designs (initial number of designs) in the first table as a redesign, and thus it can be confirmed that the optimum value is obtained with the total number of designs of 36 (that is, a second response surface including a target value can be calculated). The combination of 17 experimental conditions is added (extended) to 27, which is the number of designs (initial number of designs) in the first table as a redesign, and thus it can be confirmed that Vall_ADD falls below Vall_0 (0.391), and the sufficient accuracy in the experimental design is obtained. That is, in a case of the method of the present disclosure, the total number of designs is 44, and the same result can be obtained as in the method of the related art in which the number of designs is smaller than 10 (in other words, the experimental design can be set efficiently and accurately with 10 designs which are smaller than that in the method of the related art). In FIG. 5G, when Vall_ADD falls below Vall_0, the evaluation is shown as "satisfied". Conversely, when Vall_ADD exceeds Vall_0, the evaluation is shown as "unsatisfied." When the optimum value is obtained, the evaluation is shown as "satisfied". Conversely, when the optimum value is not obtained, the evaluation is shown as "unsatisfied". When both evaluations of Vall_ADD and the optimum value are satisfactory, the overall evaluation is shown as "satisfied". When either the evaluations of Vall_ADD and the optimum value are unsatisfactory, the overall evaluation is shown as "unsatisfied". The same applies to FIGS. 5F, 6F, 6G, 7F, 7G, 8F, and 8G.

FIGS. 6A to 6G are diagrams for explaining an example (second example) when the level value (−1, 0, 1) of X5 in the initial design is extended to (−1, 1, 3).

FIG. 6A is a table showing a second example of the first table created by an experimental design method.

FIG. 6B is a table showing the second example of the first table in which the object variable is recorded.

FIG. 6C is a table showing the second example of a table in which a combination of experimental conditions including one level value for a first control factor is deleted from the first table illustrated in FIG. 6B.

FIG. 6D is a table showing the second example of a second table that is created by adding a combination of experimental conditions including a fourth level value for a first control factor and without including one level value in the table illustrated in FIG. 6C.

FIG. 6E is a table showing the second example of the second table in which the object variable is recorded.

FIG. 6F is a table showing the number of experimental designs when a highly accurate experimental design is obtained in a comparative example.

FIG. 6G is a table showing the number of experimental designs until a highly accurate experimental design is obtained in the second example.

FIG. 6A illustrates a first table created by an experimental design method (specifically, central composite design method), and the first table in which the object variable is recorded is a table illustrated in FIG. 6B. An average prediction variance Vall_0 of the first table is 0.391. For example, when the optimum value based on the response surface in the first table can be realized by a level value for X5 between 2 and 3, a table illustrated in FIG. 6C is created by deleting, from the first table illustrated in FIG. 6B, combination of experimental conditions including the second level value 0 for X5, in this case, combination of 8 experimental conditions Nos. 9, 10, 12, 14, 16, 18, 21, and 27. A second table illustrated in FIG. 6D is created by adding, in the table illustrated in FIG. 6C, combination of experimental conditions including a fourth level value 3 for X5 and without including the second level value 0. In FIG. 6D, combination of the experimental conditions including the first level value −1 in addition to the fourth level value 3 for X5 is added, in order to prevent the level value from deviating from 3 which is a large value. Then, the object variable is recorded in the second table, and finally, the second table as illustrated in FIG. 6E is obtained.

In a case of the method of the related art as illustrated in a comparative example of FIG. 6F, the level values are redesigned, and in order to recreate the experimental design again, the total number of designs in a case of the method of the related art is, for example, 54. On the other hand, in a case of the method of the present disclosure as illustrated in FIG. 6G, the combination of the 8 experimental conditions is additionally added (extended) to 27, which is the number of designs (initial number of designs) in the first table as a redesign, and thus it can be confirmed that the optimum value is obtained with the total number of designs of 35 (that is, a second response surface including a target value can be calculated). The combination of 16 experimental conditions is added (extended) to 27, which is the number of designs (initial number of designs) in the first table as a redesign, and thus it can be confirmed that Vall_ADD falls below Vall_0 (0.391), and the sufficient accuracy in the experimental design is obtained. That is, in a case of the method of the present disclosure, the total number of designs is 43, and the same result can be obtained as in the method of the related art in which the number of designs is smaller than 11 (in other words, the experimental design can be set efficiently and accurately with 11 designs which are smaller than that in the method of the related art).

FIGS. 7A to 7G are diagrams for explaining an example (third example) when the level value (−1, 0, 1) of X5 in the initial design is extended to (−2, −1, 0).

FIG. 7A is a table showing a third example of a first table created by an experimental design method.

FIG. 7B is a table showing the third example of the first table in which the object variable is recorded.

FIG. 7C is a table showing the third example of a table in which a combination of experimental conditions including one level value for a first control factor is deleted from the first table illustrated in FIG. 7B.

FIG. 7D is a table showing the third example of a second table that is created by adding a combination of experimental conditions including a fourth level value for a first control factor and without including one level value to the table illustrated in FIG. 7C.

FIG. 7E is a table showing the third example of the second table in which the object variable is recorded.

FIG. 7F is a table showing the number of experimental designs when a highly accurate experimental design is obtained in a comparative example.

FIG. 7G is a table showing the number of experimental designs until a highly accurate experimental design is obtained in the third example.

FIG. 7A illustrates a first table created by an experimental design method (specifically, central composite design method), and the first table in which the object variable is recorded is a table illustrated in FIG. 7B. An average prediction variance Vall_0 of the first table is 0.391. For example, when the optimum value based on the response surface in the first table can be realized by a level value for X5 between −2 and −1, a table illustrated in FIG. 7C is created by deleting, from the first table illustrated in FIG. 7B, combination of experimental conditions including the third level value 1 for X5, in this case, combination of 10 experimental conditions Nos. 1, 4, 6, 7, 8, 11, 15, 23, 25, and 26. A second table illustrated in FIG. 7D is created by adding, to the table illustrated in FIG. 7C, combination of experimental conditions including a fourth level value −2 for X5 and without including the third level value 1. In FIG. 7D, combination of the experimental conditions including the second level value 0 in addition to the fourth level value −2 for X5 is added, in order to prevent the level value from deviating from −2 which is a small value. Then, the object variable is recorded in the second table, and finally, the second table as illustrated in FIG. 7E is obtained.

In a case of the method of the related art as illustrated in a comparative example of FIG. 7F, the level values are redesigned, and in order to recreate the experimental design again, the total number of designs in a case of the method of the related art is, for example, 54. On the other hand, in a case of the method of the present disclosure as illustrated in FIG. 7G, the combination of the 10 experimental conditions is additionally added (extended) to 27, which is the number of designs (initial number of designs) in the first table as a redesign, and thus it can be confirmed that the optimum value is obtained with the total number of designs of 37 (that is, a second response surface including a target value can be calculated). The combination of 20 experimental conditions is added (extended) to 27, which is the number of designs (initial number of designs) in the first table as a redesign, and thus it can be confirmed that Vall_ADD falls below Vall_0 (0.391), and the sufficient accuracy in the experimental design is obtained. That is, in a case of the method of the present disclosure, the total number of designs is 47, and the same result can be obtained as in the method of the related art in which the number of designs is smaller than 7 (in other words, the experimental design can be set efficiently and accurately with 7 designs which are smaller than that in the method of the related art).

Finally, FIGS. 8A to 8G are diagrams for explaining an example (fourth example) when the level value (−1, 0, 1) of X5 in the initial design is extended to (−3, −1, 1).

FIG. 8A is a table showing a fourth example of the first table created by an experimental design method.

FIG. 8B is a table showing the fourth example of the first table in which the object variable is recorded.

FIG. 8C is a table showing the fourth example of a table in which a combination of experimental conditions including one level value for a first control factor is deleted from the first table illustrated in FIG. 8B.

FIG. 8D is a table showing the fourth example of a second table that is created by adding a combination of experimental conditions including a fourth level value for a first control factor and without including one level value to the table illustrated in FIG. 8C.

FIG. 8E is a table showing the fourth example of the second table in which the object variable is recorded.

FIG. 8F is a table showing the number of experimental designs when a highly accurate experimental design is obtained in a comparative example.

FIG. 8G is a table showing the number of experimental designs until a highly accurate experimental design is obtained in the fourth example.

FIG. 8A illustrates a first table created by an experimental design method (specifically, central composite design method), and the first table in which the object variable is recorded is a table illustrated in FIG. 8B. An average prediction variance Vall_0 of the first table is 0.391. For example, when the optimum value based on the response surface in the first table can be realized by a level value for X5 between −3 and 2, a table illustrated in FIG. 8C is created by deleting, from the first table illustrated in FIG. 8B, combination of experimental conditions including the second level value 0 for X5, in this case, combination of 8 experimental conditions Nos. 9, 10, 12, 14, 16, 18, 21, and 27. A second table illustrated in FIG. 8D is created by adding, to the table illustrated in FIG. 8C, combination of experimental conditions including a fourth level value −3 for X5 and without including the second level value 0. In FIG. 8D, combination of the experimental conditions including the third level value 1 in addition to the fourth level value −3 for X5 is added, in order to prevent the level value from deviating from −3 which is a small value. Then, the object variable is recorded in the second table, and finally, the second table as illustrated in FIG. 8E is obtained.

In a case of the method of the related art as illustrated in a comparative example of FIG. 8F, the level values are redesigned, and in order to recreate the experimental design again, the total number of designs in a case of the method of the related art is 54. On the other hand, in a case of the method of the present disclosure as illustrated in FIG. 8G, the combination of the 8 experimental conditions is additionally added (extended) to 27, which is the number of designs (initial number of designs) in the first table as a redesign, and thus it can be confirmed that the optimum value is obtained with the total number of designs of 35 (that is, a second response surface including a target value can be calculated). The combination of 20 experimental conditions is added (extended) to 27, which is the number of designs (initial number of designs) in the first table as a redesign, and thus it can be confirmed that Vall_ADD falls below Vall_0 (0.391), and the sufficient accuracy in the experimental design is obtained. That is, in a case of the method of the present disclosure, the total number of designs is 47, and the same result can be obtained as in the method of the related art in which the number of designs is smaller than 7 (in other words, the experimental design can be set efficiently and accurately with 7 designs which are smaller than that in the method of the related art).

In the process of going through such a flow, an additional experimental point can be set efficiently and accurately.

It should be noted that all steps are not required in the flow illustrated in FIG. 2, and when designs and experiments have been made in advance, the steps may be executed from step S104, for example.

Other Exemplary Embodiments

Although the information processing method and information processing device 1 according to the exemplary embodiments have been described above, the present disclosure is not limited to the above exemplary embodiments.

For example, the steps in the information processing method may be executed by a computer (computer system). In addition, the present disclosure can be implemented as a program for causing a computer to execute the steps included in the methods. Further, the present disclosure may be implemented as a non-transitory computer-readable recording medium having recorded thereon the program, such as CD-ROM.

For example, when the present disclosure is implemented by a program (software), hardware resources, such as a CPU, a memory, and an input/output circuit in the computer, are utilized to execute the program to thereby execute the steps. That is, the CPU obtains data from the memory, the input/output circuit, or the like, performs a computational operation, and outputs a result of the computational operation to the memory, the input/output circuit, or the like to thereby execute the steps.

Some or all of the processing units included in information processing device 1 according to the above exemplary embodiment are typically implemented as an LSI which is an integrated circuit. These processing units may be formed as separate chips, or some or all of the processing units may be included in a chip.

Also, the circuit integration is not limited to LSI, and may be implemented using a dedicated circuit or general-purpose processor. A field programmable gate array (FPGA) that is programmable after manufacturing of an LSI or a reconfigurable processor in which connections and settings of circuit cells within the LSI are reconfigurable may be used.

Each of the components in the above-described exemplary embodiments may be configured in the form of a dedicated hardware product, or may be implemented by executing a software program suitable for each structural element. Each of the components may be implemented by means of a program executing unit, such as a CPU and a processor, reading and executing the software program recorded on a recording medium such as a hard disk or a semiconductor memory.

Further, the order in which the steps of each flowchart are performed is merely an example provided to specifically describe the present disclosure. Accordingly, the order is not limited to that described above. Also, one or more of the steps described above may be performed simultaneously with (in parallel to) other steps.

Although the information processing method and information processing device 1 according to one or more aspects have been described above, the present disclosure is not limited to the exemplary embodiments. Other forms in which various modifications apparent to those skilled in the art are applied to any of the aforementioned exemplary embodiments, or forms structured by combining components of different aspects of the exemplary embodiments may be included within the scope of the one or more aspects, unless such changes and modifications depart from the scope of the present disclosure.

The present disclosure can be widely used in a general electronic component, capacitors and in-vehicle batteries, or in general manufacturing processes and control processes from machining processes to chemical processes.

What is claimed is:

1. An information processing method comprising:
creating, by an experimental design method, a first table showing a plurality of combinations of experimental conditions for each of a plurality of control factors for obtaining an object variable by an experiment, the creating being performed based on a plurality of level values including a first level value, a second level value larger than the first level value, and a third level value larger than the second level value which are set for each of the plurality of control factors including a first factor;
recording, in the first table, an object variable acquired based on the first table;
calculating a first response surface related to the object variable for the plurality of control factors using the first table in which the object variable is recorded;
setting a fourth level value which is different from the first level value, the second level value, and the third level value for the first control factor, when the calculated first response surface does not include a target value related to the object variable for the first control factor;
creating, by the experimental design method, a second table showing a plurality of combinations of the experimental conditions for each of the plurality of control factors, by (i) deleting at least one combination of the experimental conditions which include at least one level value of the first level value, the second level value, and the third level value which are for the first control factor from the first table in which the object variable is recorded, and (ii) adding at least one combination of the experimental conditions for each of the plurality of control factors based on a plurality of level values including the fourth level value and without including the deleted one level value for the first control factor to the first table;

recording, in the second table, an object variable acquired based on the second table;

calculating a second response surface related to the object variable and including the target value for the plurality of control factors using the second table in which the object variable is recorded; and outputting the calculated second response surface, wherein the output second response surface is utilized to optimize and practice the plurality of control factors in a control or manufacturing environment.

2. The information processing method of claim 1, wherein when a level value corresponding to the target value is smaller than the first level value, and a distance between the level value corresponding to the target value and the first level value is equal to or larger than a difference between the second level value and the first level value, at least one combination of the experimental conditions including the second level value for the first control factor as the one level value is deleted from the first table in which the object variable is recorded, and a value smaller than the level value corresponding to the target value is set as the fourth level value, when the level value corresponding to the target value is smaller than the first level value, and the distance between the level value corresponding to the target value and the first level value is smaller than the difference between the second level value and the first level value, at least one combination of the experimental conditions including the third level value for the first control factor as the one level value is deleted from the first table in which the object variable is recorded, and a value smaller than the level value corresponding to the target value is set as the fourth level value, when the level value corresponding to the target value is larger than the third level value, and a distance between the level value corresponding to the target value and the third level value is equal to or larger than a difference between the third level value and the second level value, at least one combination of the experimental conditions including the second level value for the first control factor as the one level value is deleted from the first table in which the object variable is recorded, and a value larger than the level value corresponding to the target value is set as the fourth level value, and when the level value corresponding to the target value is larger than the third level value, and the distance between the level value corresponding to the target value and the third level value is smaller than the difference between the third level value and the second level value, at least one combination of the experimental conditions including the first level value for the first control factor as the one level value is deleted from the first table in which the object variable is recorded, and a value larger than the level value corresponding to the target value is set as the fourth level value.

3. The information processing method of claim 1, wherein adding the at least one combination of the experimental conditions when the second table is created is performed until a value of an average prediction variance calculated for the second table is smaller than a value of an average prediction variance calculated for the first table.

4. The information processing method of claim 1, wherein the first table is created based on a central composite design method.

5. A non-transitory computer readable medium having recorded thereon a program for causing a computer to execute the information processing method of claim 1.

6. An information processing device comprising:

a processor; and a memory, wherein by executing a program stored in the memory, the processor creates, by an experimental design method, a first table showing a plurality of combinations of experimental conditions for each of a plurality of control factors for obtaining an object variable by an experiment, based on a plurality of level values including a first level value, a second level value larger than the first level value, and a third level value larger than the second level value which are set for each of the plurality of control factors including a first control factor, records, in the first table, an object variable acquired based on the first table, calculates a first response surface related to the object variable for the plurality of control factors using the first table in which the object variable is recorded, sets a fourth level value which is different from the first level value, the second level value, and the third level value for the first control factor, when the calculated first response surface does not include a target value related to the object variable for the first control factor, creates, by the experimental design method, a second table showing a plurality of combinations of the experimental conditions for each of the plurality of control factors, by deleting at least one combination of the experimental conditions which include at least one level value of the first level value, the second level value, and the third level value which are for the first control factor from the first table in which the object variable is recorded, and adding at least one combination of the experimental conditions for each of the plurality of control factors based on the plurality of level values including the fourth level value and without including the deleted one level value for the first control factor to the first table, records, in the second table, an object variable acquired based on the second table, calculates a second response surface related to the object variable and including the target value for the plurality of control factors using the second table in which the object variable is recorded, and outputs the calculated second response surface, wherein the output second response surface is utilized to optimize and practice the plurality of control factors in a control or manufacturing environment.

* * * * *